(12) United States Patent  
Thompson et al.

(10) Patent No.: US 11,826,725 B2  
(45) Date of Patent: Nov. 28, 2023

(54) CERAMIC ARTICLE AND METHODS OF MAKING THE SAME

(71) Applicant: SAINT-GOBAIN CERAMICS & PLASTICS, INC., Worcester, MA (US)

(72) Inventors: Matthew J. Thompson, Stow, OH (US); Thomas Szymanski, Hudson, OH (US); Randall Clayton Yeates, Sugar Land, TX (US); James M. Ralph, Copley, OH (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 34 days.

(21) Appl. No.: 17/645,006

(22) Filed: Dec. 17, 2021

(65) Prior Publication Data

US 2022/0203332 A1 Jun. 30, 2022

Related U.S. Application Data

(60) Provisional application No. 63/199,441, filed on Dec. 29, 2020.

(51) Int. Cl.
*B01J 21/04* (2006.01)
*B01J 23/42* (2006.01)
(Continued)

(52) U.S. Cl.
CPC .............. *B01J 21/04* (2013.01); *B01J 23/42* (2013.01); *B01J 23/44* (2013.01); *B01J 23/50* (2013.01);
(Continued)

(58) Field of Classification Search
CPC ... B01J 21/04; B01J 23/42; B01J 23/44; B01J 23/50; B01J 23/72; B01J 23/755;
(Continued)

(56) References Cited

U.S. PATENT DOCUMENTS 3,145,183 A 8/1964 Fisher
3,563,913 A * 2/1971 Krijer et al. ............. B01J 23/50
502/348

(Continued)

FOREIGN PATENT DOCUMENTS

WO 03/014041 A2 2/2003
WO 2006/133187 A2 12/2006
WO 2013/077839 A1 5/2013

OTHER PUBLICATIONS

International Search Report from PCT Application No. PCT/US2021/073005 dated Jun. 17, 2022, 3 pgs.

(Continued)

*Primary Examiner* — Cam N. Nguyen
(74) *Attorney, Agent, or Firm* — Stewart Allan Fraser; Ann Palma

(57) ABSTRACT

Ceramic articles such as catalyst carriers that include a continuous matrix and a dispersed phase distributed within the matrix as a plurality of discrete regions are disclosed. The matrix and discreet regions have different dye penetration test values. The disclosure also relates to methods of making and characterizing ceramic articles, and to catalyst bodies including the ceramic articles.

13 Claims, 10 Drawing Sheets

(51) Int. Cl.
  *B01J 23/44*  (2006.01)
  *B01J 23/50*  (2006.01)
  *B01J 23/72*  (2006.01)
  *B01J 23/755* (2006.01)
  *B01J 35/10*  (2006.01)
  *B01J 37/02*  (2006.01)
  *B01J 37/04*  (2006.01)
  *B01J 37/08*  (2006.01)

(52) U.S. Cl.
  CPC .............. *B01J 23/72* (2013.01); *B01J 23/755* (2013.01); *B01J 35/1038* (2013.01); *B01J 35/1042* (2013.01); *B01J 37/0215* (2013.01); *B01J 37/04* (2013.01); *B01J 37/08* (2013.01)

(58) Field of Classification Search
  CPC  B01J 35/1038; B01J 35/1042; B01J 37/0215; B01J 37/04; B01J 37/08
  USPC ................. 502/332–339, 346, 355, 415, 439
  See application file for complete search history.

(56) References Cited

U.S. PATENT DOCUMENTS

| | | | | |
|---|---|---|---|---|
| 4,444,899 A * | 4/1984 | Yamada | ............... | B01J 37/0009 502/355 |
| 5,380,697 A * | 1/1995 | Matusz | ................. | B01J 23/688 549/534 |
| 5,384,302 A * | 1/1995 | Gerdes | ................. | B01J 37/0009 502/355 |
| 5,512,530 A * | 4/1996 | Gerdes | .................... | B01J 21/04 502/439 |
| 5,597,773 A | 1/1997 | Evans et al. | | |
| 5,733,842 A * | 3/1998 | Gerdes | ..................... | B01J 23/02 502/355 |
| 6,180,258 B1 * | 1/2001 | Klier | ..................... | C04B 41/009 501/88 |
| 7,307,034 B2 * | 12/2007 | Negiz | ..................... | C07C 6/126 502/64 |
| 7,811,650 B2 * | 10/2010 | Ohno | .................. | C04B 38/0006 428/116 |
| 7,825,062 B2 * | 11/2010 | Gerdes | ................. | B01J 37/0009 502/355 |
| 8,871,677 B2 * | 10/2014 | Richard | ............... | B01J 35/1038 549/534 |
| 9,339,798 B2 * | 5/2016 | Richard | ............... | B01J 35/109 |
| 9,540,573 B2 * | 1/2017 | Bhan | ............... | B01J 37/0009 502/355 |
| 10,124,318 B2 * | 11/2018 | Suchanek | .............. | B01J 35/108 |
| 10,676,401 B2 * | 6/2020 | Adam | ............... | B01J 20/3085 |
| 11,141,715 B2 * | 10/2021 | Tsai | .......... | B01J 21/04 |
| 11,185,847 B2 * | 11/2021 | Suchanek | ........... | B01J 35/1047 |
| 11,331,652 B2 * | 5/2022 | Suchanek | ............... | B01J 21/04 |
| 2004/0110973 A1 * | 6/2004 | Matusz | ................... | B01J 35/10 549/534 |
| 2004/0138483 A1 * | 7/2004 | Rubinstein | ............... | B01J 23/50 549/536 |
| 2009/0177016 A1 * | 7/2009 | Lockemeyer | ......... | C07C 29/106 502/200 |

OTHER PUBLICATIONS

Written Opinion from PCT Application No. PCT/US2021/073005 dated Jun. 17, 2022, 4 pgs.

* cited by examiner

CERAMIC ARTICLE AND METHODS OF MAKING THE SAME

CROSS-REFERENCE TO RELATED APPLICATION

This application claims priority under 35 U.S.C. § 119(e) to U.S. Provisional Application No. 63/199,441, entitled "CERAMIC ARTICLE AND METHODS OF MAKING THE SAME," by Matthew J. THOMPSON, et al., filed Dec. 29, 2020, which application is assigned to the current assignee hereof and incorporated herein by reference in its entirety.

FIELD OF THE INVENTION

The present disclosure relates generally to a ceramic article that includes a plurality of first alumina particles that form a continuous matrix and a plurality of second alumina particles that are dispersed within the matrix and the first and second pluralities of alumina particles have different dye penetration test values. The disclosure also relates to a catalyst that incorporates a catalytically active material on the surface of the ceramic article.

BACKGROUND OF THE INVENTION

Catalysts are generally made by impregnating a carrier, typically a ceramic article made from ceramic material, with a catalytically active material, for example, a metal. A catalyst where the weight ratio of catalytically active material to the carrier is too high can be undesirable in certain aspects. For example, even if a catalyst has a high lifetime due to the high loading of the catalytically active material the catalyst can be too expensive and economically unfeasible if used in a reactor where a lower catalyst loading per unit volume in the reactor is desired. Therefore, there is a need in the art for ceramic carriers for catalysts where the structure of the ceramic carrier allows for modulating the loading of the active catalyst material in the catalyst body.

SUMMARY OF THE INVENTION

The disclosure relates to a ceramic article comprising a rigid formation of alumina particles. The rigid formation comprises a plurality of first alumina particles and a plurality of second alumina particles. Both pluralities of particles are randomly distributed throughout the rigid formation. The second alumina particles have a $ZnI_2$ dye penetration test value no greater than 5 atomic percent and the first alumina particles have a $ZnI_2$ dye penetration test value at least twice the second alumina particles' $ZnI_2$ dye penetration test value. The rigid formation has a total cross-sectional area. Each plurality of particles occupies a portion of the total cross-sectional area and the cross-sectional area of the second alumina particles is between 5% and 50% of the total cross-sectional area.

In some aspects, embodiments of the ceramic article have a $ZnI_2$ dye penetration test value of the dispersed phase (i.e., the second alumina powder) that is lower than a $ZnI_2$ dye penetration test value of the continuous matrix (i.e., the first alumina powder). One embodiment relates to a ceramic article wherein the ratio of the first alumina particle's dye penetration test value to the second alumina' dye penetration test value is at least 2:1. One embodiment relates to a ceramic article wherein the dye penetration test value is obtained by a method including one or more of scanning electron microscopy (SEM) and energy dispersive X-ray spectroscopy (EDS). One embodiment relates to a ceramic article wherein the penetration test value is determined by a $ZnI_2$ dye penetration test. One embodiment relates to a ceramic article wherein the plurality of first alumina particles, which forms the continuous matrix, has a $ZnI_2$ dye penetration test value equal to or higher than 10 atomic percent. One embodiment relates to a ceramic article wherein the plurality of second alumina particles, which form the dispersed phase, has a $ZnI_2$ dye penetration test value equal to or less than 5 atomic percent.

In some aspects, embodiments of the ceramic article have a total pore volume that is between about $0.2$ $cm^3/g$ and about $0.7$ $cm^3/g$. One embodiment relates to a ceramic article wherein the total pore volume is between about $0.3$ $cm^3/g$ and about $0.6$ $cm^3/g$. One embodiment relates to a ceramic article wherein the total pore volume of the ceramic article is between about $0.35$ $cm^3/g$ and about $0.5$ $cm^3/g$. One embodiment relates to a ceramic article wherein a total surface area is between about $0.4$ $m^2/g$ and about $3$ $m^2/g$. One embodiment relates to a ceramic article wherein the total surface area is between about $0.4$ $m^2/g$ and about $1.5$ $m^2/g$. One embodiment relates to a ceramic article wherein the total surface area is between about $0.5$ $m^2/g$ and about $0.85$ $m^2/g$.

The disclosure also relates to a metal based catalyst body including a metal deposited on a ceramic article described herein. One embodiment relates to a catalyst body wherein the metal is silver. One embodiment relates to a catalyst body including silver deposited on a ceramic article, the ceramic article including a continuous alumina matrix, and a dispersed alumina phase distributed within the continuous alumina matrix as a plurality of discrete regions, wherein: the article has a total pore volume between $0.3$ $cm^3/g$ and $0.6$ $cm^3/g$ and a total surface area between $0.5$ $m^2/g$ and $0.85$ $m^2/g$; the continuous alumina matrix has an $ZnI_2$ dye penetration test value equal to, or higher than 10%, and the dispersed alumina phase has an $ZnI_2$ dye penetration test value equal to or less than 5 atomic percent, the dispersed alumina phase covers between 5% and 50% of the ceramic article's cross-sectional area.

One embodiment relates to a method for making a ceramic article wherein the first plurality of alumina particles and the second plurality of alumina particles include alpha-alumina. One embodiment relates to a method for making a ceramic article wherein the second plurality of alumina particles includes fused alumina. One embodiment relates to a method for making a ceramic article wherein the second plurality of alumina particles includes tabular alumina. One embodiment relates to a method for making a ceramic article that includes a bond material and wherein the bond material is magnesium silicate.

BRIEF DESCRIPTION OF THE DRAWINGS

The foregoing summary, as well as the following detailed description of the invention, will be better understood when read in conjunction with the appended drawings.

DETAILED DESCRIPTION OF THE INVENTION

Figure 1:
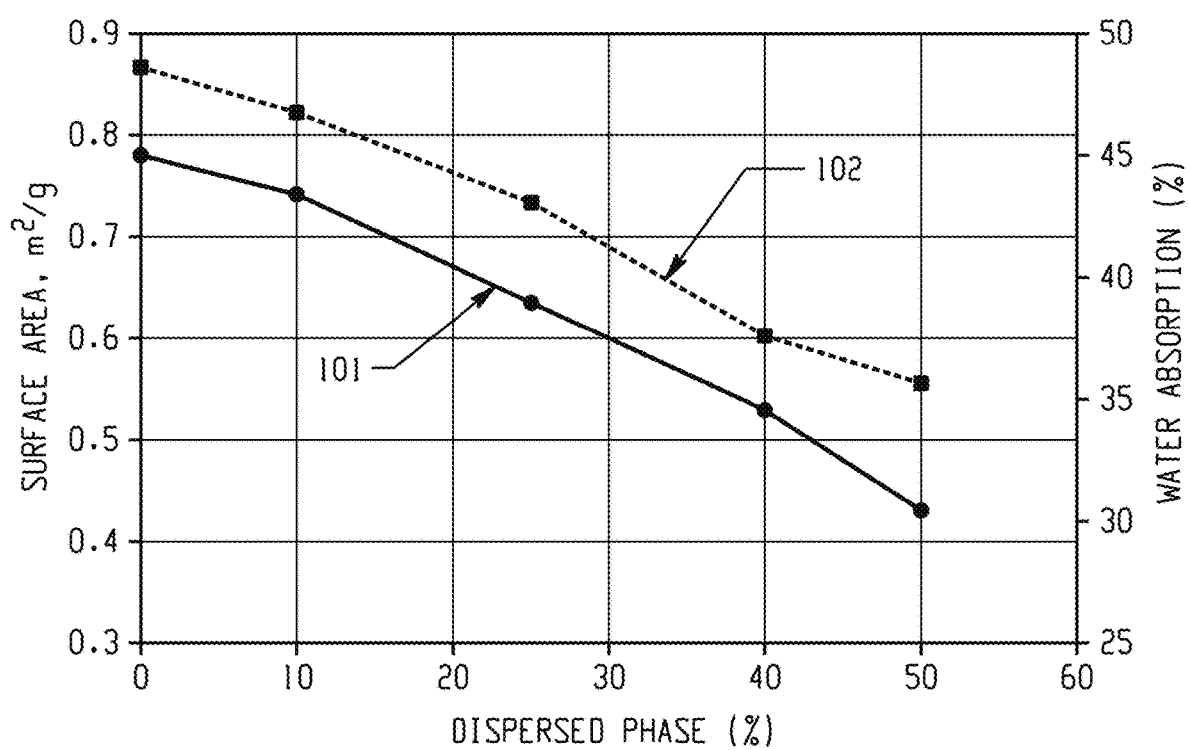
FIG. 1 shows that the surface area and the water absorption of the ceramic article as a function of the quantity of the dispersed phase.

The disclosure relates generally to ceramic articles that can be used in various applications, including catalyst carrier applications, for example as catalyst carriers for a catalyst used in the direct oxidation of ethylene to produce ethylene oxide. The ceramic articles described herein include at least a plurality of first alumina particles and a plurality of second alumina particles. The disclosure also relates to methods of making the articles from the first alumina particles and the second alumina particles.

Without wishing to be bound by any particular theory, it is believed that as described herein, a ceramic article can be provided for making catalyst carriers that solves the problem of how to modulate the amount of active catalyst material to be loaded on the carriers thereby offering a more economically competitive catalyst where, for example, lower catalyst loading on a volume basis in the reactor is desired. As described herein, the addition of high density (i.e., low porosity) regions throughout the silver impregnated catalyst enables the catalyst to simulate a higher work rate than would be possible in an otherwise identical catalyst that does not contain the low porosity regions thereby enabling a reduction in the amount of silver in the reactor while maintaining the reactor's rate of production. In some embodiments, such modulation may simulate a high work rate in a catalyst system, for example, an ethylene oxidation (EO) catalyst system. By introducing a large, high density/low porosity region within the carrier, there are now regions within the carrier that active catalyst material cannot penetrate. However, in the matrix regions surrounding the large, high density/low porosity regions the ratio of water absorption to surface area remains preserved, maintaining the expected concentration and particle size of active catalyst material in the matrix region. By maintaining the water absorption to surface area ratio in the matrix region, the initial catalytic performance is expected to be maintained compared to a carrier made without a large, high density/low porosity region, even though the total loading of active catalyst material on the carrier is now reduced. Using a lower amount of active catalyst material, for example, silver, provides an economic advantage in cases where the expected lifetime of the catalyst is relatively short, such that a higher amount of active catalyst material provides no advantage over the life of the catalyst. In addition, it is desirable that the shrinkage of the aluminas used in the carrier are suitably matched to avoid cracking around one or more of the alumina particles during the thermal treatment of the carriers during manufacture. Porosity introduced due to any cracking can alter the water absorption to surface area ratio of the matrix phase which may have the effect of degrading some of the advantages introduced by this invention.

One embodiment relates to a ceramic article, the article including a continuous matrix including a plurality of first alumina particles, and a dispersed phase including a plurality of second alumina particles. The second alumina particles, which are distributed within the continuous matrix, may be described as a plurality of discrete regions. The dispersed phase has a different $ZnI_2$ dye penetration test value than the continuous matrix and in a cross-section of the ceramic article the dispersed phase covers between about 8% and about 40% of the ceramic article's cross-sectional area.

As used herein, the word "ratio" is defined as the numerical relationship between the first quantity of a specific characteristic, such as: weight, particle size, atomic percent, surface area, a portion of a cross-sectional surface area, etc. to a second quantity of the same characteristic. Several illustrative examples will now be provided. In a first example, in a mixture of two alumina powders having a total mass of 100 grams and consisting of a first alumina and a second alumina wherein the quantity of the first alumina is 95 grams and the quantity of the second alumina is 5 grams then the ratio of the first alumina to the second alumina is 95:5. For convenience, the ratio can be written as 19:1. If the quantity of each alumina is expressed as a percentage of the total alumina then the percentage of the first alumina is 95 weight percent and the percentage of the second alumina is 5 weight percent. In a second example, if the $d_{50}$ particle size of the first alumina is 10 microns and the $d_{50}$ particle size of the second alumina is 150 microns then the ratio is 10:150 which can be simplified to 1:15. This ratio requires the $d_{50}$ particle size of the second alumina to be fifteen times greater than the $d_{50}$ particle size of the first alumina. In a third example, if the surface area of the first alumina is 5 $m^2/g$ and the surface area of the second alumina is 0.5 $m^2/g$ then the ratio is 5:0.5 which can be written as 10:1. This ratio requires the surface area of the first alumina to be ten times greater than the surface area of the second alumina. In a fourth example, if the total cross-sectional surface area of an article is 10 $cm^2$ and the total cross-sectional surface area of the article consists only of a first powder that occupies 8 $cm^2$ and a second powder that occupies 2 $cm^2$ then the ratio of the cross-sectional surface areas occupied by the first and second powders, respectively, is 8:2 which can be written as 4:1. This ratio requires the cross-sectional surface area occupied by the first powder to be four times greater than the cross-sectional surface area occupied by the second powder. Expressed as percentages, the first powder occupies 80 percent of the total cross-sectional surface area and the second powder occupies 20 percent of the total cross-sectional surface area. In a fifth example, if the total cross-sectional surface area of an article is 10 $cm^2$ and the total cross-sectional surface area consists only of a first powder that occupies 5 $cm^2$ and a second powder that occupies 5 $cm^2$ then the ratio of the cross-sectional surface areas occupied by the first and second powders, respectively, is 5:5 which can be written as 1:1. Expressed as percentages, the first powder occupies 50 percent of the total cross-sectional surface area and the second powder occupies 50 percent of the total cross-sectional surface area. In a sixth example, if the total cross-sectional surface area of an article is 20 $cm^2$ and the total cross-sectional surface area consists only of a first powder that occupies 19.0 $cm^2$ and a second powder that occupies 1.0 $cm^2$ then the ratio of the cross-sectional surface areas occupied by the first and second powders, respectively, is 19:1. Expressed as percentages, the first powder occupies 95 percent of the total surface area and the second powder occupies 5 percent of the total surface area. Therefore, in an embodiment where the ratio of the cross-sectional area of said first alumina particles to the cross-sectional area of said second alumina particles is between 1.0:1.0 and 19.0:1.0 then the cross-sectional surface area of the first alumina is between 50% and 95% of the total cross-sectional surface area and the cross-sectional surface area of the second alumina is between 50% and 5% of the total cross-sectional surface area.

One embodiment of an invention described herein is a ceramic article comprising a rigid formation of alumina particles that comprises a plurality of first alumina particles and a plurality of second alumina particles. Both pluralities of particles are randomly distributed throughout the rigid formation. The second alumina particles have a $ZnI_2$ dye penetration test value no greater than 5 atomic percent and the first alumina particles have a $ZnI_2$ dye penetration test value at least twice the second alumina particles' $ZnI_2$ dye penetration test value. Each plurality of particles occupies a portion of the rigid formation's total cross-sectional area. The second alumina particles cover between about 8% and about 40% of the ceramic article's cross-sectional area, more preferably between 10% and 30% of the total. A catalytically active metal is dispersed on the first and second alumina particles.

Another embodiment of an invention described herein is a process for the manufacture of an article comprising a rigid formation of alumina particles and a catalytically active metal in contact with the particles. The process comprises the following steps. Providing a plurality of first alpha alumina particles having a known weight and a $d_{50}$ particle size between about 0.2 and 100 microns. Providing a plurality of second alpha alumina particles having a known weight and selected from the group consisting of fused alumina and tabular alumina. The second alumina particles have a $d_{50}$ particle size between about 5 and 400 microns. The ratio of the first alumina particle's $d_{50}$ particle size to the second alumina particle's $d_{50}$ particle size is between 1:4 and 1:40. The ratio of the first alumina's weight to the second alumina's weight is between 1:1 and 19:1. Mixing the pluralities of alumina particles thereby forming a mixture wherein the particles are randomly distributed throughout the mixture. Forming the mixture into a plurality of malleable articles. Heating the malleable articles to the sintering temperature of the alumina particles thereby forming each malleable article into a rigid formation of alumina particles wherein the particles in each plurality of particles are randomly distributed throughout the rigid formation. Depositing a catalytically active metal on the first and second alumina particles.

As used herein, continuous matrix refers to the portion of the ceramic article that has relatively unchanged morphological properties throughout the entire article in any direction and, as a minimum, for a distance greater than the longest particle in the dispersed phase. When viewing a cross-section of the article the continuous matrix appears to surround the discrete regions of the dispersed phase which appear as individual, standalone particles that rarely contact another particle of the dispersed phase. The definition of continuous matrix applies notwithstanding that in certain formulations there may be included pores which may introduce gaps in the matrix. With reference to FIG. 2C, region 212 is part of the continuous matrix, region 206 is a discrete region of the dispersed phase, and region 218 is a pore region. This definition applies and is not negated by the inappropriate selection of a highly magnified visual examination technique that, at certain magnifications and due to a very limited (highly magnified) field of view, a region of the matrix may not appear continuous.

Figure 3A:
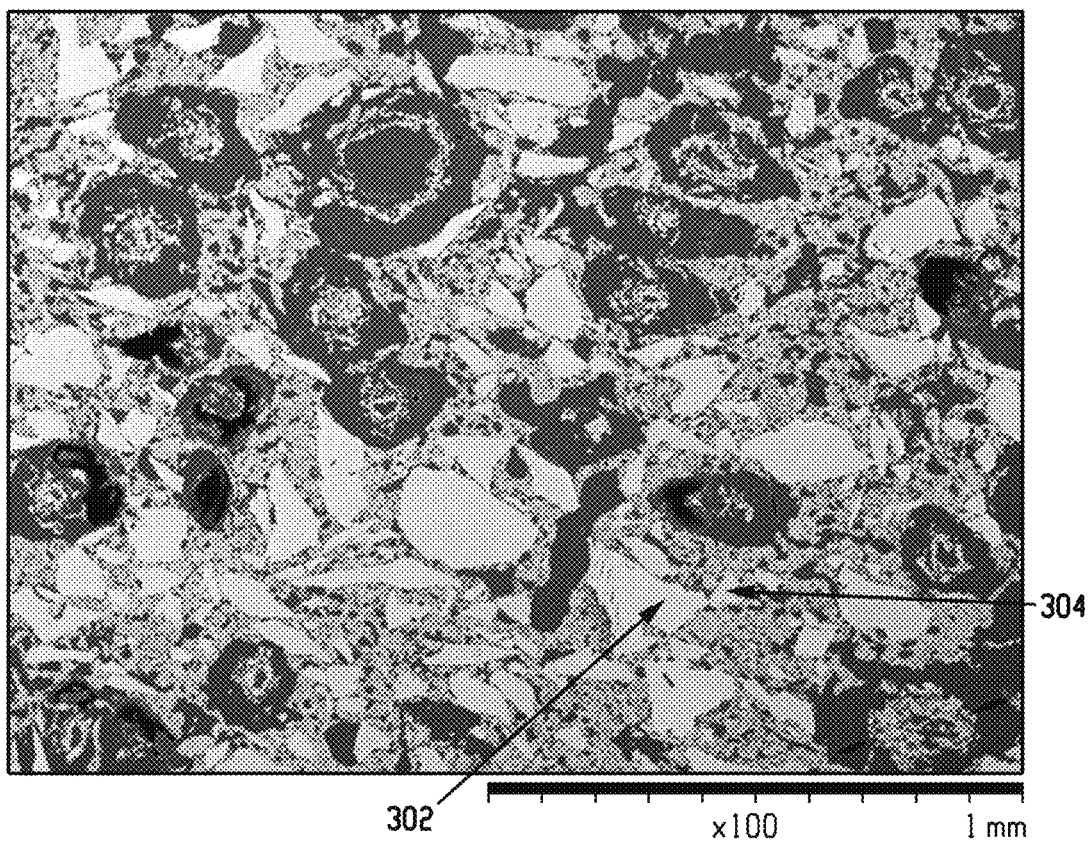
FIGS. 3A and 3B show SEM images of articles of this invention that have been mounted in epoxy, cross-sectioned, and polished to 1 μm finish.
Figure 5A:
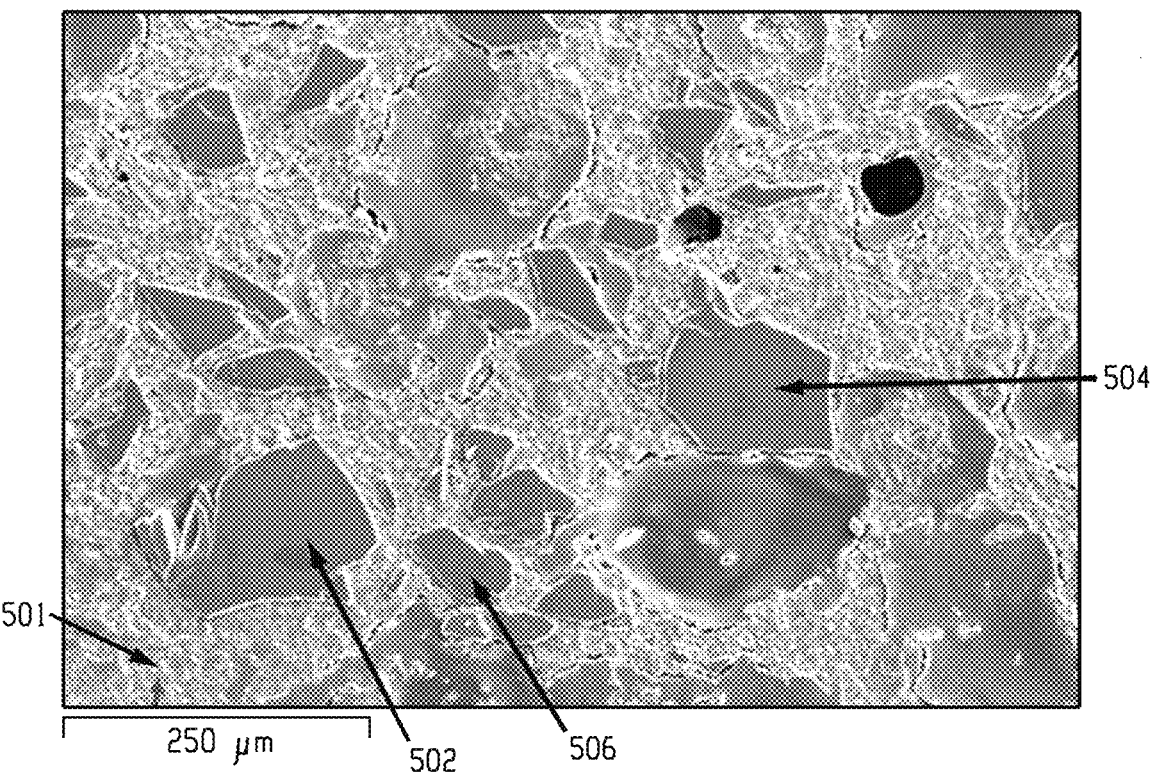
FIGS. 5A and 5B show EDS data for another embodiment of the present invention.

As used herein, dispersed phase refers to the discrete regions which are generally insular and isolated relative to the encompassing continuous matrix. This definition of dispersed phase applies notwithstanding that some dispersed regions may be abutting, touching, or be sintered to other dispersed regions (see for example FIG. 3A, showing abutting discrete regions 302 and 304 of the dispersed phase). In contrast, as shown in FIG. 5A, region 501 is part of the continuous matrix, while region 502 is a discrete region in the dispersed phase.

The dispersed phase coverage of the cross-section can be measured at a magnification between 100× to 250×, but any other suitable magnification can be used. In some embodiments, the cross-section area has a first dimension between about 0.6 mm and about 1.5 mm, and a second dimension between about 0.45 mm and about 1 mm. In some embodiments, the first dimension can be the length, and the second dimension can be the width. In some embodiments, in the cross-section of the ceramic article, a majority of the plurality of discrete regions appear to have a longest dimension between about 10 µm and about 150 µm. Without wishing to be bound by any particular theory, a size can include any size of a discrete region, for example, a Feret diameter (see for example Henk G. Merkus, Particle Size Measurements: Fundamentals, Practice, Quality; 1 Jan. 2009; Springer, p. 15).

Penetration test values are determined using a $ZnI_2$ solution penetration test which is described below. The $ZnI_2$ dye penetration test value of the dispersed phase is lower than a $ZnI_2$ dye penetration test value of the continuous matrix. Generally, a $ZnI_2$ dye penetration test value is obtained by subjecting the ceramic article to a $ZnI_2$ dye penetration test using a $ZnI_2$ containing solution. Upon contacting the ceramic article with the $ZnI_2$ solution, for example by sinking the article into the solution, the solution will be absorbed into the ceramic article. The solution includes chemical compounds, which once absorbed into the ceramic article, can be ascertained as absorbed into the article by various analytical methods.

Generally, $ZnI_2$, which is used to determine the penetration test value, is dissolved into an appropriate solvent, for example, water. One or more samples of the ceramic article are introduced into the resulting $ZnI_2$ solution. Optionally, the solution with the ceramic materials can be subjected to vacuum, which can ensure better penetration of the solution into the ceramic article. After removing the samples from the solution, drying is employed to remove the solvent and leave the $ZnI_2$ embedded in the ceramic article. The dried samples are mounted by setting the samples in a polymer or resinous material. The samples can be optionally polished, cut, or both, to afford a smooth cross section of the ceramic article. The ceramic article samples are carbon coated and then analyzed by scanning electron microscopy (SEM), and/or energy-dispersive X-ray spectroscopy. By computing the amount of penetration test material in the continuous matrix and the dispersed phase the penetration test values of the respective areas can be calculated.

In some embodiments, a difference in the penetration test values is at least 5%. In other embodiments, a difference in the penetration test value is at least 5.1%, at least 5.2%, at least 5.3%, at least 5.4%, at least 5.5%, at least 5.6%, at least 5.7%, at least 5.8%, at least 5.9%, at least 6%, at least 6.1%, at least 6.2%, at least 6.3%, at least 6.4%, at least 6.5%, at least 6.6%, at least 6.7%, at least 6.8%, at least 6.9%, at least 7%, at least 7.1%, at least 7.2%, at least 7.3%, at least 7.4%, at least 7.5%, at least 7.6%, at least 7.7%, at least 7.8%, at least 7.9%, at least 8%, at least 8.1%, at least 8.2%, at least 8.3%, at least 8.4%, at least 8.5%, at least 8.6%, at least 8.7%, at least 8.8%, at least 8.9%, at least 9%, at least 9.1%, at least 9.2%, at least 9.3%, at least 9.4%, at least 9.5%, at least 9.6%, at least 9.7%, at least 9.8%, at least 9.9%, or at least 10%.

In some embodiments, the first alumina's $ZnI_2$ dye penetration test value is at least three times greater than the second alumina's $ZnI_2$ dye penetration value.

In some embodiments, the first alumina's $ZnI_2$ dye penetration test value is at least four times greater than the second alumina's $ZnI_2$ dye penetration value.

In some embodiments, a ratio of the dye penetration test value of the continuous matrix to the dye penetration test value of the dispersed phase is at least 2.0. In other embodiments, a ratio of the penetration test value of the continuous matrix to the dye penetration test value of the dispersed phase is at least 2.1, at least 2.2, at least 2.3, at least 2.4, at least 2.5, at least 2.6, at least 2.7, at least 2.8, at least 2.9, at least 3, at least 3.1, at least 3.2, at least 3.3, at least 3.4, at least 3.5, at least 3.6, at least 3.7, at least 3.8, at least 3.9, at least 4, at least 4.1, at least 4.2, at least 4.3, at least 4.4, at least 4.5, at least 4.6, at least 4.7, at least 4.8, at least 4.9, or at least 5.

In some embodiments, the continuous matrix has a $ZnI_2$ penetration test value higher than 10%. In other embodiments, the continuous matrix has a $ZnI_2$ penetration test value, of at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, or at least 50%.

In some embodiments, the dispersed phase has a $ZnI_2$ dye penetration test value equal to or less than 5%. In other embodiments, the dispersed phase has a $ZnI_2$ dye penetration test value of less than 1%, less than 1.1%, less than 1.2%, less than 1.3%, less than 1.4%, less than 1.5%, less than 1.6%, less than 1.7%, less than 1.8%, less than 1.9%, less than 2%, less than 2.1%, less than 2.2%, less than 2.3%, less than 2.4%, less than 2.5%, less than 2.6%, less than 2.7%, less than 2.8%, less than 2.9%, less than 3%, less than 3.1%, less than 3.2%, less than 3.3%, less than 3.4%, less than 3.5%, less than 3.6%, less than 3.7%, less than 3.8%, less than 3.9%, less than 4%, less than 4.1%, less than 4.2%, less than 4.3%, less than 4.4%, less than 4.5%, less than 4.6%, less than 4.7%, less than 4.8%, or less than 4.9%.

In some embodiments, the ceramic article has a total pore volume between about 0.2 $cm^3/g$ and about 0.7 $cm^3/g$. In some embodiments, the ceramic article has a total pore volume between about 0.3 $cm^3/g$ and about 0.6 $cm^3/g$. In some embodiments, the ceramic article has a total pore volume between about 0.35 $cm^3/g$ and about 0.5 $cm^3/g$. The total pore volume, the median pore diameter, and the pore size distribution of a carrier may be measured by a conventional mercury intrusion porosimetry device in which liquid mercury is forced into the pores of a carrier. Greater pressure is needed to force the mercury into the smaller pores and the measurement of pressure increments corresponds to volume increments in the pores penetrated and hence to the size of the pores in the incremental volume. An alumina's pore size distribution and pore volume can be measured by mercury intrusion porosimetry beginning at 689 Pa and then increased to $4.1 \times 10^7$ Pa using a Micromeritics Model 9520 Autopore IV (130° mercury contact angle, mercury with a surface tension of 0.480 N/m, and correction for mercury compression applied). A minimum of one hundred data points is appropriate. As used herein, the median pore diameter is understood to mean the pore diameter corresponding to the point in the pore size distribution at which 50% of the total pore volume is found in pores having less than (or greater than) said point.

In other embodiments, the ceramic article can have a pore volume of about 0.20 $cm^3/g$, about 0.21 $cm^3/g$, about 0.22 $cm^3/g$, about 0.23 $cm^3/g$, about 0.24 $cm^3/g$, about 0.25 $cm^3/g$, about 0.26 $cm^3/g$, about 0.27 $cm^3/g$, about 0.28 $cm^3/g$, about 0.29 $cm^3/g$, 0.30 $cm^3/g$, about 0.31 $cm^3/g$, about 0.32 $cm^3/g$, about 0.33 $cm^3/g$, about 0.34 $cm^3/g$, about 0.35 $cm^3/g$, about 0.36 $cm^3/g$, about 0.37 $cm^3/g$, about 0.38 $cm^3/g$, about 0.39 $cm^3/g$, 0.40 $cm^3/g$, about 0.41 $cm^3/g$, about 0.42 $cm^3/g$, about 0.43 $cm^3/g$, about 0.44 $cm^3/g$, about 0.45 $cm^3/g$, about 0.46 $cm^3/g$, about 0.47 $cm^3/g$, about 0.48 $cm^3/g$, about 0.49 $cm^3/g$, 0.50 $cm^3/g$, about 0.51 $cm^3/g$, about 0.52 $cm^3/g$, about 0.53 $cm^3/g$, about 0.54 $cm^3/g$, about 0.55 $cm^3/g$, about 0.56 $cm^3/g$, about 0.57 $cm^3/g$, about 0.58 $cm^3/g$, about 0.59 $cm^3/g$, about 0.60 $cm^3/g$, about 0.61 $cm^3/g$, about 0.62 $cm^3/g$, about 0.63 $cm^3/g$, about 0.64 $cm^3/g$, about 0.65 $cm^3/g$, about 0.66 $cm^3/g$, about 0.67 $cm^3/g$, about 0.68 $cm^3/g$, about 0.69 $cm^3/g$, or about 0.70 $cm^3/g$.

In some embodiments, the ceramic article has a total surface area between about 0.4 $m^2/g$ and about 3 $m^2/g$. In some embodiments, the ceramic article has a total surface area between about 0.4 $m^2/g$ and about 1.5 $m^2/g$. In some embodiments, the ceramic article has a total surface area between about 0.5 $m^2/g$ and about 0.85 $m^2/g$.

The method used to measure a ceramic article's surface area will now be described. A Gas Sorption Analyzer was used to determine the Specific Surface Area (SSA), also referred to herein as "surface area", of each ceramic article following the Brunauer-Emmett-Teller (BET) method which measures 5 points using liquid nitrogen at 77° K. The method can be used for determining the SSA of a thermally stable material with Type II or IV nitrogen sorption isotherms. This procedure follows the guidelines set by the IUPAC (International Union of Pure and Applied Chemistry), which are also incorporated into the ASTM and ISO standards, referenced in the following: Thommes, M. et al., Physisorption of gases, with special reference to the evaluation of surface area and pore size distribution (IUPAC Technical Report). Pure Appl. Chem., 87 (9-10) (2015), pp. 1051-1069. Stephen Brunauer, P. H. Emmett, and Edward Teller, Adsorption of Gases in Multimolecular Layers. J. Am. Chem. Soc. 1938, 60, 2, 309-319. ASTM D3663-20 and ASTM C1069-09. ISO 9277:2010.

The surface area measurements included in this application were made using a Micromeritics ASAP 2420 or ASAP 2460 using test tubes with a 20 cc bulb filled to the maximum level. Samples were degassed at 250° C. for 2 hours, then cooled and backfilled with nitrogen. Sample tubes were then loaded onto analysis ports and BET analysis run. The surface area was calculated through the BET equation. The calculations were done using five data points of $N_2$ sorption at relative pressures (P/Po) ranging from 0.05 to 0.30, targeting the following relative pressures: 0.100, 0.125, 0.175, 0.225, and 0.270 P/Po.

In other embodiments, the ceramic article has a total surface area of about 0.5 $m^2/g$, about 0.6 $m^2/g$, about 0.7 $m^2/g$, about 0.8 $m^2/g$, about 0.9 $m^2/g$, about 1 $m^2/g$, about 1.1 $m^2/g$, about 1.2 $m^2/g$, about 1.3 $m^2/g$, about 1.4 $m^2/g$, about 1.5 $m^2/g$, about 1.6 $m^2/g$, about 1.7 $m^2/g$, about 1.8 $m^2/g$, about 1.9 $m^2/g$, about 2 $m^2/g$, about 2.1 $m^2/g$, about 2.2 $m^2/g$, about 2.3 $m^2/g$, about 2.4 $m^2/g$, about 2.5 $m^2/g$, about 2.6 $m^2/g$, about 2.7 $m^2/g$, about 2.8 $m^2/g$, about 2.9 $m^2/g$, or about 3.0 $m^2/g$.

As used herein, the "water absorption" of carriers was determined using the following process. An analytical balance was used to weigh out two 100 gram lots of carrier. The dry weight of each lot was recorded and calculate the total dry weight (DW) of the combined lots was calculated. Each lot was deposited into one of two stainless steel swing buckets that each measure 80 mm long by 60 mm wide by 70 mm high. The baskets were constructed from 10 mesh stainless steel screen using wire that has a 0.889 mm (0.035 inches) diameter and are suitable for use in an Eppendorf Swing Basket Rotor A-4-62 centrifuge which is available from Eppendorf North America in Hauppauge, New York, USA. The loaded wire baskets were placed into a vacuum chamber and a vacuum was pulled to 25 mm Hg for two minutes. The carriers were flooded with water until they are completely covered. The vacuum was again pulled to 25 mm Hg and held for two minutes. The vacuum was released and the chamber was allowed to return to atmospheric pressure and remain undisturbed for two minutes. The loaded wire baskets were placed in the Eppendorf Swing Basket Rotor A-4-62 centrifuge machine and the loaded baskets were spun at 300 revolutions per minute (rpm) for a total spin time of one minute. The carriers were emptied from the baskets onto a single shallow pan whose weight had been previously recorded. The centrifuge weight (CW) of the combined lots was calculated by weighing the pan with the carriers loaded thereon and subtracting the weight of the pan. The water absorption was determined by subtracting the dry weight (DW) from the centrifuge weight (CW) to obtain a difference which was then divided by the dry weight (DW) and multiplied by 100.

As used herein, a powder's packing density is determined as follows. Using a 100 mL graduated cylinder, weigh the graduated cylinder (A) to the nearest 0.01 g and then place it on an automated tapped density analyzer's platform and secure it. Add a volume of sample to the capacity of the graduated cylinder. Set the counter for 1000 taps and initiate tapping. When 1000 taps are completed, read, and record the volume (V) of the sample. Volume should be measured to within 0.5 mL. Weigh the sample and graduated cylinder (B) to the nearest 0.01 g. Tapped Packing Density can then be calculated as the weight of the powder (B-A) divided by the recorded volume, V.

In one embodiment, the ceramic article includes a continuous alumina matrix, and a dispersed alumina phase distributed within the matrix as a plurality of discrete regions, wherein the ceramic article has a total pore volume between 0.3 cm$^3$/g and 0.6 cm$^3$/g and a total surface area between 0.5 m$^2$/g and 0.85 m$^2$/g; a majority of the plurality of discrete regions each have a size of about 10 μm to about 150 μm; the continuous alumina matrix has a ZnI$_2$ dye penetration test value equal to, or higher than 10%, and the dispersed alumina phase has a ZnI$_2$ dye penetration test value equal to or less than 5% and in a cross-section of the ceramic article having a first dimension between about 0.6 mm and about 1.5 mm, and a second dimension between about 0.45 mm and about 1 mm, the dispersed alumina phase covers between 5% and 50%, more preferably between 8% and 40%, even more preferably between 10% and 30% of the cross-sectional area.

The disclosure also relates to a catalyst including a metal deposited on the ceramic article described herein. One embodiment relates to a catalyst wherein the metal is silver deposited on a ceramic article described herein. The disclosure relates to a method of modulating the amount of metal loaded onto the article by varying the ratio between the quantity of the first alumina powder and the quantity of the second alumina powder used to make the carrier. Because the dispersed phase is less porous than the continuous matrix (as reflected in the lower ZnI$_2$ penetration test value of the dispersed phase), the dispersed phase has a lower metal catalyst loading than the continuous matrix. Thus, by increasing the ratio of dispersed phase to the continuous matrix in the ceramic article, the metal catalyst loading can be decreased, and conversely, by decreasing the ratio of dispersed phase to the continuous matrix in the ceramic article, the metal catalyst loading can be increased.

To manufacture an article of this invention certain physical and chemical characteristics, specifically the surface areas and the $d_{50}$ particle sizes of the first and second aluminas may be controlled and coordinated. Powders useful in the manufacture of an article of this invention can be selected using the information in Table 1 and the following description as a guide.

TABLE 1

| | $d_{50}$ Particle Size (microns) | | | Surface Area (m$^2$/g) | | |
|---|---|---|---|---|---|---|
| | General Range | Preferred Range | Most Preferred | General Range | Preferred Range | Most Preferred |
| 1$^{st}$ alumina | 0.2 to 100 | 2 to 20 | 5 to 10 | 1 to 20 | 1 to 5 | 1 to 2 |
| 2$^{nd}$ alumina | 5 to 400 | 10 to 200 | 40 to 150 | 0.02 to 2.00 | 0.10 to 0.50 | 0.14 to 0.30 |
| Ratio of 1$^{st}$ alumina to 2$^{nd}$ alumina | 1:4 to 1:40 | 1:5 to 1:20 | 1:8 to 1:15 | 7:1 to 15:1 | 5:1 to 10:1 | 4:1 to 5:1 |

Preferably the first alumina power is an alpha alumina with a $d_{50}$ particle size between 0.2 and 100 microns, more preferably between 2 and 20 microns, most preferably between 5 and 10 microns. The first alumina powder may be manufactured in a process where the maximum firing temperature is approximately 1600° C. and the surface area is between 1 and 20 m$^2$/g, preferably 1 to 5 m$^2$/g and more preferably between 1 to 2 m$^2$/g. The first alumina powder may contain internal porosity which contributes significantly to its total surface area which is a measure of the surface areas contributed by the particles' internal porosity and the particles' geometric surface area. The first alumina powder should not be a fused alumina nor a tabular alumina. As used herein, tabular alumina is defined as aluminum oxide that has been heated to temperatures above 1,650° C. and is composed of tablet like crystals. As used herein, fused alumina is defined as calcined alumina that has been melted in an electric-arc furnace, cooled, crushed, and recast into desired shapes. Calcined alumina is aluminum oxide that has been heated at temperatures in excess of 1,050° C. to drive off nearly all chemically combined water.

Preferably, the second alumina is an alpha alumina selected from the group consisting of tabular alumina and fused alumina. The second alumina powder is an alpha alumina that has been made in a process wherein the maximum firing temperature may be above the melting point of the alumina, as in the case of fused alumina, or just below the melting point of the alumina as is the case with tabular alumina. The $d_{50}$ particle size of the second alumina may be between 5 and 400 microns, more preferably between 10 and 200 microns, most preferably between 40 and 150 microns. Because the second alumina powder has been fired near to or above the melting point of the alumina, the second alumina powder has very little internal porosity. The lack of internal porosity results in a lower total surface area than a first alumina powder of similar particle size because there is no internal porosity to contribute to the total surface area. Second alumina powders that have not been subjected to a grinding process to reduce the particle size have surface areas between 0.2 and 2.0 m$^2$/g, preferably between 0.10 and 0.50 m$^2$/g, more preferably between 0.14 and 0.30 m$^2$/g.

Selecting the ratio of the $d_{50}$ particle size of the first alumina to the $d_{50}$ particle size of the second alumina can be used to control the total surface area of the article made from the first and second alumina powders. As a general rule, the particle size of the first alumina powder should be much smaller than the particle size of the second alumina powder. Preferably, the $d_{90}$ of the first alumina should be less than the $d_{10}$ of the second alumina. More preferably, the $d_{95}$ of the first alumina should be less than the dos of the second alumina. Even more preferably, the $d_{99}$ of the first alumina should be less than the $d_{10}$ of the second alumina. Preferably the particle size distributions of the first and second aluminas should be monomodal.

More specifically, the ratio of the $d_{50}$ particle size of the first alumina powder to the $d_{50}$ particle size of the second alumina powder may be between 1:4 and 1:40, preferably between 1:5 and 1:20, more preferably between 1:8 and 1:15. These ratios indicate that the $d_{50}$ particle size of the second alumina powder should be no more than 40, preferably no more than 20, more preferably no more than 15 times larger than the $d_{50}$ particle size of the first alumina powder. The ratios also indicate that the $d_{50}$ particle size of the second alumina powder should be at least 4, preferably at least 5, more preferably at least 8 times larger than the $d_{50}$ particle size of the first alumina powder.

In addition to the absolute $d_{50}$ particle sizes of the first and second alumina powders and their ratios, the surface areas of the first alumina and the second alumina powders may be used to select powders that are useful to make an article of this invention. As a general rule, the surface area per gram of the first alumina powder should be much larger than the surface area per gram of the second alumina powder. More specifically, the ratio of the surface area of the first alumina powder to the surface area of the second alumina powder may be between 7:1 and 15:1, preferably between 5:1 and 10:1, more preferably between 4:1 and 5:1. These ratios indicate that the surface area of the first alumina powder should be no more than 15, preferably no more than 10, more preferably no more than 5 times larger than the surface area of the second alumina powder. The ratios also indicate that the surface area of the first alumina powder should be at least 7, preferably at least 5, more preferably at least 4 times larger than the surface area of the second alumina powder.

The particles of the second alumina, which may be referred to herein as the dispersed phase, are randomly distributed throughout the continuous matrix phase. The second alumina particles are considered not to form a continuous phase if at least 70% of the second alumina's particles that are visible in an SEM micrograph at the desired magnification of an article of this invention do not appear to touch other second alumina particles. Second alumina particles may appear to be physically isolated from other second alumina particles by a plurality of first alumina particles that completely or partially surround the second alumina particles.

In addition to the types of aluminas, the specific $d_{50}$ particle sizes and their ratios, the weight ratios of the first and second powders may be controlled to ensure that the cross-sectional area of the second alumina particles is at least 5% to 50%, more preferably 8% to 40%, even more preferably 10% to 30% of the total cross-sectional area of the article. The ratio of the weight of the first alumina powder to the second alumina powder could be 15:1 to 1:1. Intermediate ratios of 14:1, 12:1, 10:1, 8:1, 7:1, 6:1, 5:1, 4:1, 3:1 and 2:1 are feasible.

One embodiment relates to a method for making a ceramic article wherein the first alumina powder may be at least 85 weight percent alpha-alumina. More preferably the first alumina powder may be at least 90 weight percent, 95 weight percent, or 99 weight percent alpha alumina. One embodiment relates to a method for making a ceramic article wherein the second alumina powder may be just fused alumina, just tabular alumina, or a mixture of tabular alumina and fused alumina.

As described herein, particle size is determined by laser scattering using the Horiba particle LA-950 laser scattering particle size distribution analyzer. The analyzer uses the principles of Mie scattering theory for measuring particle size and distribution in a range of 0.01 microns to 3000 microns. The median particle size, referred to herein as "$d_{50}$", represents a particle diameter at which there are equal spherical equivalent volumes of particles larger and particles smaller than the stated median particle size. The method includes adding 3 drops of a 10% Darvan® solution, dispersing the particles by ultrasonic treatment, thus breaking up secondary particles into primary particles. This sonification treatment is continued until no further change in the $d_{50}$ value is noticed, which typically requires a 1 to 5 minute sonification when using the Horiba LA-950 particle size analyzer.

In some embodiments, the method for making a ceramic article includes the use of a bond material, for example, magnesium silicate. If desired, one or more optional additives may be included when preparing a ceramic article. For example, it may be desirable to include one or more additives to facilitate forming a formed body and/or to alter one or more of the characteristics of the resulting ceramic article. Suitable additives may include any of the wide variety of known carrier additives, which include, but are not limited to: bonding agents, e.g., polyolefin oxides, celluloses, alkaline earth metal compounds, such as magnesium silicate and calcium silicate, and alkali metal compounds; extrusion aids, e.g., petroleum jelly, hydrogenated oil, synthetic alcohol, synthetic ester, glycol, starch, polyolefin oxide, polyethylene glycol, and mixtures thereof; solvents, e.g., water; peptizing acids, e.g., a monofunctional aliphatic carboxylic acid containing from 1 to about 5 carbon atoms, such as formic acid, acetic acid, and/or propanoic acid; a halogenated monofunctional aliphatic carboxylic acid containing from 1 to about 5 carbon atoms, such as mono-, di-, and trichloro acetic acid, etc.; fluxing agents, binders, dispersants, burnout materials, also known as "pore formers", strength-enhancing additives, etc. It is within the ability of one skilled in the art to select suitable additives in appropriate amounts, taking into consideration, for example, the preparation method and the desired properties of the resulting ceramic article.

In some embodiments, the process includes the use of formic acid. Formic acid may function to stabilize the particles' dispersion in the mixture. In some embodiments, formic acid is added to the mixture at about 1% (w/w %), about 1.5% (w/w %), about 2% (w/w %), about 2.5% (w/w %), about 3% (w/w %), about 3.5% (w/w %), about 4% (w/w %), about 4.5% (w/w %), about 5% (w/w %), about 5.5% (w/w %), about 6% (w/w %), about 6.5% (w/w %), about 7% (w/w %), or about 7.5% (w/w %).

In some embodiments, the mixture further includes one or more thermally decomposable materials. The mixture may contain a quantity of thermally decomposable material of from about 2% (w/w %) to about 40% (w/w %), or in the range of from about 5% (w/w %) to about 30% (w/w %). A thermally decomposable material may function as a pore former. As used herein, the thermally decomposable material is a solid in particulate form. The thermally decomposable material is mixed with the alumina powders prior to the heating step, for example with a greenware mix of at least two different types of alumina. Individual particles of thermally decomposable material occupy a multitude of small spaces in the mixture. The individual particles of thermally decomposable material are removed by thermal decomposition during the heating step and/or sintering step, thereby leaving pores in the ceramic article forming the carrier. The pores may also be described as a plurality of voids distributed throughout the ceramic article. In some embodiments, the majority of pores made by use of a thermally decomposable material are encompassed within the continuous matrix. For example, at least 50%, at least 60%, at least 70%, at least 80%, or at least 90% of pores made by use of a thermally decomposable material are encompassed within the continuous matrix.

The thermally decomposable material should not be soluble in any of the other ingredients used to make the ceramic article. Similarly, the thermally decomposable material should not dissolve any of the other ingredients. Because the thermally decomposable material occupies a volume prior to the heating step and the spaces occupied by the material remain generally unoccupied after the heating step has been completed, the material functions as a pore former. The thermally decomposable material useful in a process of this invention is typically an organic material. Suitably the chemical formula of the organic material comprises carbon and hydrogen. The thermally decomposable material may be a synthetic or a naturally occurring material or a mixture of the same. Preferably, the thermally decomposable material may be an organic material that has a decomposition temperature which is no greater than the sintering temperature of the alumina powders. This ensures that the thermally decomposable material is at least partly removed prior to or simultaneously with the sintering of the alumina powders. To facilitate decomposition, the chemical formula of the thermally decomposable material may preferably comprise carbon, hydrogen, and oxygen. The decomposition temperature may be lowered by the presence of oxygen.

In some embodiments, the mixture further includes one or more naturally occurring thermally decomposable materials that result in the formation of pores during burnout. As used herein, naturally occurring thermally decomposable materials do not include the polymers in the formulation and do not include other processing aides. Rather, naturally occurring thermally decomposable materials refers to burnout materials optionally included when preparing a ceramic article to facilitate the shaping of a formed body and/or to alter the porosity of a resulting ceramic article. Typically, burnout materials are burned out, sublimed, or volatilized during drying, calcining, and/or sintering. Examples of suitable burnout materials include, but are not limited to, comminuted shells of nuts such as pecan, cashew, walnut, peach, apricot, and filbert. Any other naturally occurring thermally decomposable materials known in the art can be used. In some embodiments, no more than 0.1 mL/g of pore volume in the resulting ceramic article is due to the use of burnout material. In some embodiments, no naturally occurring thermally decomposable materials are included in the mixture.

The thermally decomposable material may be a synthetic material. The synthetic material may be a polymer material. Without wishing to be bound by any particular theory, and as used herein, synthetic materials are contemplated not to include naturally occurring thermally decomposable materials. The polymer material may be formed using an emulsion polymerization, including suspension polymerization, which is often preferred since the polymer can be obtained in the form of fine particles that are directly usable as thermally decomposable material. Preferably, the polymer material may be formed using anionic polymerization. The polymer material may be olefin polymers and copolymers, for example, polyethylene, polypropylene, polystyrene, polyvinyl alcohol, ethylene-vinyl acetate, and ethylene-vinyl alcohol copolymers, diene polymers and copolymers such as polybutadiene, EPDM rubber, styrene-butadiene copolymers, and butadiene-acrylonitrile rubbers, polyamides such as polyamide-6, and polyamide-66, polyesters such as polyethylene terephthalate. Preferably, the polymer material may be hydrocarbon polymers such as polyolefins, more preferably polypropylene.

The thermally decomposable material may be screened or otherwise sorted to limit the size of the individual particles to a specific particle size range. If desired, a first thermally decomposable material, having particles within a first particle size range, may be combined with a second thermally decomposable material, having particles within a second particle size range, to obtain a multimodal distribution of pore sizes in the porous ceramic article. The limitations on a particle size range are determined by the size of the pores to be created in the porous ceramic article of the carrier.

In some embodiments, the mixture further includes one or more polymers or copolymers selected from hydroxypropyl methylcellulose, a vinyl chloride copolymer, a vinyl acetate copolymer, an olefin polymer, an olefin copolymer, polyethylene, polypropylene, polystyrene, polyvinyl alcohol, an ethylene-vinyl acetate copolymer, an ethylene-vinyl alcohol copolymer, a diene polymer, a diene copolymer, polybutadiene, an ethylene propylene diene monomers (EPDM) rubber, a styrene-butadiene copolymer, a butadiene acrylonitrile rubber, a polyamide, polyamide-6, polyamide-66, a polyester, polyethylene terephthalate, a hydrocarbon polymer, a polyolefin, and polypropylene. The one or more polymers or copolymers may function as lubricants and/or pore formers.

The carrier bodies may be formed from the mixture by any convenient forming process, such as spray drying, agglomeration, or pressing, and preferably they are formed by extrusion of the mixture. For applicable methods, reference may be made to, for example, U.S. Pat. Nos. 5,145,824, 5,512,530, 5,384,302, 5,100,859, and 5,733,842, which are each herein incorporated by reference. To facilitate such forming processes, in particular extrusion, the mixture may suitably be compounded with 2 to 25% w/w and preferably from 5 to 15% w/w of processing aids. Processing aids, also referred to by the term "extrusion aids," are known in the art, as described for example in "Kirk-Othmer Encyclopedia of Chemical Technology," 4th edition, Volume 5, p. 610. Suitable processing aids are typically liquids or greasy substances, for example, petroleum jelly, hydrogenated oil, synthetic alcohol, synthetic ester, glycol, or polyolefin oxide. Boric acid may also be added to the mixture, for example in a quantity of up to 0.5% w/w %, more typically in a quantity of from 0.01 to 0.5% w/w %. All formulation weights are based on the total weight of the ceramics, such as alumina and zirconia, in the mixture.

In some embodiments, the process further includes extruding the mixture before calcining and/or sintering. In some embodiments, the process further includes forming the mixture into one or more discrete bodies before calcining and/or sintering, for example, the mixture may be formed into carrier bodies. In general, the size of the carrier bodies is determined by the dimensions of the reactor in which they are to be deposited. Generally, however, it is found very convenient to use carrier bodies in the form of cylinders, spheres, doughnuts, and the like. The cylinders may be solid or hollow, straight, or bent, and they may have their length from 4 to 20 mm, typically from 5 to 15 mm, their outside diameter from 4 to 20 mm, typically from 5 to 15 mm, and their inside diameter from 0.1 to 6 mm, typically from 0.2 to 4 mm. The cylinders may have a ratio of length to outside diameter in the range of from 0.5 to 2, typically from 0.8 to 1.2.

The formed parts can be produced in a variety of shapes such as cylindrical, spherical, annular, or multi-lobed. For example, shaped pellets may be formed by extruding a continuous rod of the paste and then cutting the rod into pellets of the desired size. Ring-based shaped structures of any desired configuration such as "wagon wheels" or any other extruded shapes with constant cross-sections such as for example multi-lobed structures and small honeycombs may be formed by extruding the paste through a suitably shaped die and then cutting the rod into pellets of a constant cross section. The shaped articles may also be in the form of large honeycomb monoliths. However, the extrusion/pressing process is not limited to these shapes. The parts may have an outer diameter, or average width when non-circular, of from about 0.8 to about 25 mm, although other sizes may be formed. Reference may be made to U.S. Patent Pub. No. 2012/0171407, incorporated by reference herein, for further description of multi-lobed carriers. Additionally, the size of the ceramic article carrier is generally not limited, and may include any size suitable for use in a catalytic reactor, for example, an ethylene oxidation reactor. For example, a ceramic article carrier may be in the shape of a cylinder having a length of 5 to 15 millimeters, an outside diameter of 5 to 15 mm, and an inside diameter of 0.2 to 4 mm. In some embodiments, the ceramic article carrier may have a length-to-outside diameter ratio of 0.8 to 1.2. Additionally, the ceramic article carrier may be in the shape of a hollow cylinder with a wall thickness of 1 to 7 mm. It is within the ability of one skilled in the art, with the benefit of this disclosure, to select a suitable shape and size of a ceramic article carrier, taking into consideration, for example, the type and configuration of the catalytic reactor in which the ceramic article carrier will be employed, e.g., the length and internal diameter of the tubes within the catalytic reactor.

In some embodiments, the process further includes drying the shaped bodies. The formed shaped bodies may be dried to remove at least a portion of the water present, if any. Water might convert to steam during the heating step, described hereinafter, and adversely affect the physical integrity of the shaped bodies. The drying may occur after the preparation of the mixture and optional forming of the mixture into a plurality of shaped bodies. The drying step may be combined with the heating step by controlling the thermal profile of the oven or kiln. Drying may take place between 20° C. and 400° C., or between 30° C. and 300° C., typically for a period of up to about 100 hours, and preferably from about 5 minutes to about 50 hours. Typically, drying is performed to the extent that the mixture contains less than 2% w/w of water.

Calcination and/or sintering is generally conducted at a temperature that is high enough, and for a period of time that is sufficiently long enough, for a period of time up to about 100 hours, and preferably from about 5 minutes to about 50 hours. In some embodiments, calcination and/or sintering may be conducted at one or more temperatures, at one or more pressures, and for one or more time periods, sufficient to sinter at least 50%, or at least 75%, or at least 85%, or at least 90%, or at least 95% of the mixture of at least two types of alumina. In some embodiments, the process includes heating the mixture at a temperature of at least 1200° C. In some embodiments, the process includes heating the mixture at a temperature of up to 1600° C. In some embodiments, the process includes heating the mixture at a temperature of between about 1200° C. and about 1600° C. Calcining and/or sintering may be carried out in any suitable atmosphere, including but not limited to, air, nitrogen, argon, helium, carbon dioxide, water vapor, etc. In those embodiments where a formed body further comprises an organic burnout material, at least one of heating and/or calcining is at least partially or entirely carried out in an oxidizing atmosphere, such as in an oxygen-containing atmosphere. As used herein, calcining and/or sintering means the process of firing and consolidating a green body made and formed from powder particles. The particles are bound to adjoining particles to form a rigid formation of alumina particles. Voids may exist between and/or within the particles and collectively contribute to the porosity of the ceramic article.

After calcining and/or sintering, the resulting ceramic article may optionally be washed and/or treated prior to deposition of an active catalytic material. Likewise, if desired, any raw materials used to form the ceramic article may be washed and/or treated prior to calcination and/or sintering. Any method known in the art for washing and/or treating may be used in accordance with the present disclosure, provided that such method does not negatively affect the performance of the resulting carrier or catalyst. Reference is made to U.S. Pat. Nos. 6,368,998, 7,232,918, 7,741, 499, and WO 2007/092022, which are each incorporated herein by reference, for descriptions relating to such methods. If washing is desired, it is typically conducted at a temperature in the range of from 15° C. to 120° C., and for a period of time up to about 100 hours and preferably from about 5 minutes to about 50 hours. Washing may be conducted in either a continuous or batch fashion. Examples of suitable washing solutions may include, but are not limited to, water, e.g., deionized water, aqueous solutions comprising one or more salts, e.g., ammonium salts, amine solutions, e.g., ethylenediamine, aqueous organic diluents, and a combination thereof. Similarly, suitable aqueous solutions may be acidic, basic, or neutral. The volume of washing solution may be such that the ceramic article is impregnated until a point of incipient wetness of the ceramic article has been reached. Alternatively, a larger volume may be used and the surplus of solution may be removed from the wet ceramic article, for example, by centrifugation. Furthermore, following any washing and/or treating step, it is preferable, prior to deposition of the catalytic article, to dry or roast the ceramic article. For example, the ceramic article may be dried in a stream of air, for example at a temperature of from about 80° C. to about 400° C., for a sufficient period of time.

The formed ceramic article can either be used directly as catalysts or as catalytic carriers after the shaped bodies have been impregnated, during, or after their formation, with a solution of a catalytically active substance and optionally activated by means of suitable post-treatment. Suitable catalytically active substances include transition metal elements, such as those from groups VB, VIIIB, and IB of the periodic table of elements, e.g., vanadium, gold, platinum group metals, and others. In some embodiments, the metal is a catalytically active metal including for example silver, cobalt, ruthenium, and/or iron. In particular silver is a preferred metal. Exemplary applications in which the carrier may be employed include direct ethylene oxidation, but the ceramic article is contemplated to be used in any application.

EXAMPLES

Processes for manufacturing carriers for use in epoxidation reactions are described in numerous publications including U.S. Pat. Nos. 5,100,859 and 6,831,037 which are incorporated herein by reference. See, for example, the disclosure in U.S. Pat. No. 5,100,859 which begins at column 2, line 6 and continues to column 6, line 43. The following examples describe some embodiments of this invention in further detail. These examples are provided for illustrative purposes only and should not be considered as limiting the invention. Carrier A is a comparative example. Carriers B, C, D, and E are embodiments of the invention described herein.

Carrier A (Comparative Example)

Carrier A, the comparative carrier in this disclosure, was prepared according to the teachings in U.S. Pat. No. 5,100,859 (Gerdes) that pertain to Carrier L disclosed therein with the following modifications. The only alumina powder used in the comparative Carrier A had a $d_{50}$ particle size of 7.7 microns, a surface area of 1.4 m²/g, a packing density of 0.78 g/cc, and will be referred to herein as a first plurality of alumina particles. The first plurality of alumina particles was combined with zirconia, magnesium silicate, walnut shell flour, boric acid, and extrusion aids. The combination of the first plurality of alumina particles, zirconia, magnesium silicate, and walnut shell flour is defined herein as Carrier A's dry mixture. The combined weight of the dry mixture with water, boric acid, and extrusion aids is defined herein as Carrier A's wet mixture which was extruded to form hollow cylinders that were dried and fired. In Carrier A, the first plurality of alumina particles formed a single continuous matrix phase throughout the carrier. Carrier A did not contain a dispersed phase. The physical and chemical characteristics of the fired cylinders, which may be referred to as ceramic articles, carriers, or supports, were determined using the analytical techniques described above. Carrier A's water absorption was 48.7 g/g and the surface area was 0.78 m²/g.

Carrier B (an Embodiment of this Invention)

Carrier B, an embodiment of this invention, was made by following the process used to make comparative Carrier A described immediately above except that 10 weight percent of Carrier A's dry mixture was replaced with an equivalent mass of a plurality of fused alumina particles, designated herein as the second plurality of alumina particles, thereby forming Carrier B's dry mixture. The second plurality of alumina particles had a $d_{50}$ of 119.7 microns, a surface area of 0.2 m²/g, and a packing density of 2.1 g/cc. Carrier B's dry mixture was combined with water, boric acid, and extrusion aids to create Carrier B's wet mixture which was then extruded to form hollow cylinders that were dried and fired. The physical and chemical characteristics of the fired cylinders were determined. Carrier B's water absorption was 46.70 g/g and the surface area was 0.74 m²/g.

Carrier C (an Embodiment of this Invention)

Carrier C, an embodiment of this invention, was made by following the process used to make Carrier A described above except that 25 weight percent of Carrier A's dry mixture was replaced with an equivalent mass of a plurality of fused alumina particles, designated herein as the second plurality of alumina particles, thereby forming Carrier C's dry mixture. The second plurality of alumina particles had a $d_{50}$ of 119.7 microns, a surface area of 0.2 m²/g, and a packing density of 2.1 g/cc. Carrier C's dry mixture was combined with water, boric acid, and extrusion aids to create Carrier C's wet mixture which was then extruded to form hollow cylinders that were dried and fired. The physical and chemical characteristics of the fired cylinders were determined. Carrier C's water absorption was 42.86 g/g and the surface area was 0.63 m²/g.

Carrier D (an Embodiment of this Invention)

Carrier D, an embodiment of this invention, was made by following the process used to make Carrier A described above except that 40 weight percent of Carrier A's dry mixture was replaced with an equivalent mass of a plurality of fused alumina particles, designated herein as the second plurality of alumina particles, thereby forming Carrier D's dry mixture. The second plurality of alumina particles had a $d_{50}$ of 119.7 microns, a surface area of 0.2 m²/g, and a packing density of 2.1 g/cc. Carrier D's dry mixture was combined with water, boric acid, and extrusion aids to create Carrier D's wet mixture which was then extruded to form hollow cylinders that were dried and fired. The physical and chemical characteristics of the fired cylinders were determined. Carrier D's water absorption was 37.70 g/g and the surface area was 0.53 m²/g.

Carrier E (an Embodiment of this Invention)

Carrier E, an embodiment of this invention, was made by following the process used to make Carrier A described above except that 50 weight percent of Carrier A's dry mixture was replaced with an equivalent mass of a plurality of fused alumina particles, designated herein as the second plurality of alumina particles, thereby forming Carrier E's dry mixture. The second plurality of alumina particles had a $d_{50}$ of 119.7 microns, a surface area of 0.2 m²/g, and a packing density of 2.1 g/cc. Carrier E's dry mixture was combined with water, boric acid, and extrusion aids to create Carrier E's wet mixture which was then extruded to form hollow cylinders that were dried and fired. The physical and chemical characteristics of the fired cylinders were determined. Carrier E's water absorption was 35.64 g/g and the surface area was 0.43 m²/g.

FIG. 1 shows the carrier's surface area and water absorption are dependent upon the amount of dispersed phase alumina in the carrier. Curve 101 shows the relationship between the carrier's surface area and weight percent of the dispersed phase calculated as a percentage of Carrier A's dry mixture. Curve 102 shows the relationship between the carrier's water absorption and weight percent of the dispersed phase calculated as a percentage of Carrier A's dry mixture.

Figure 2A:
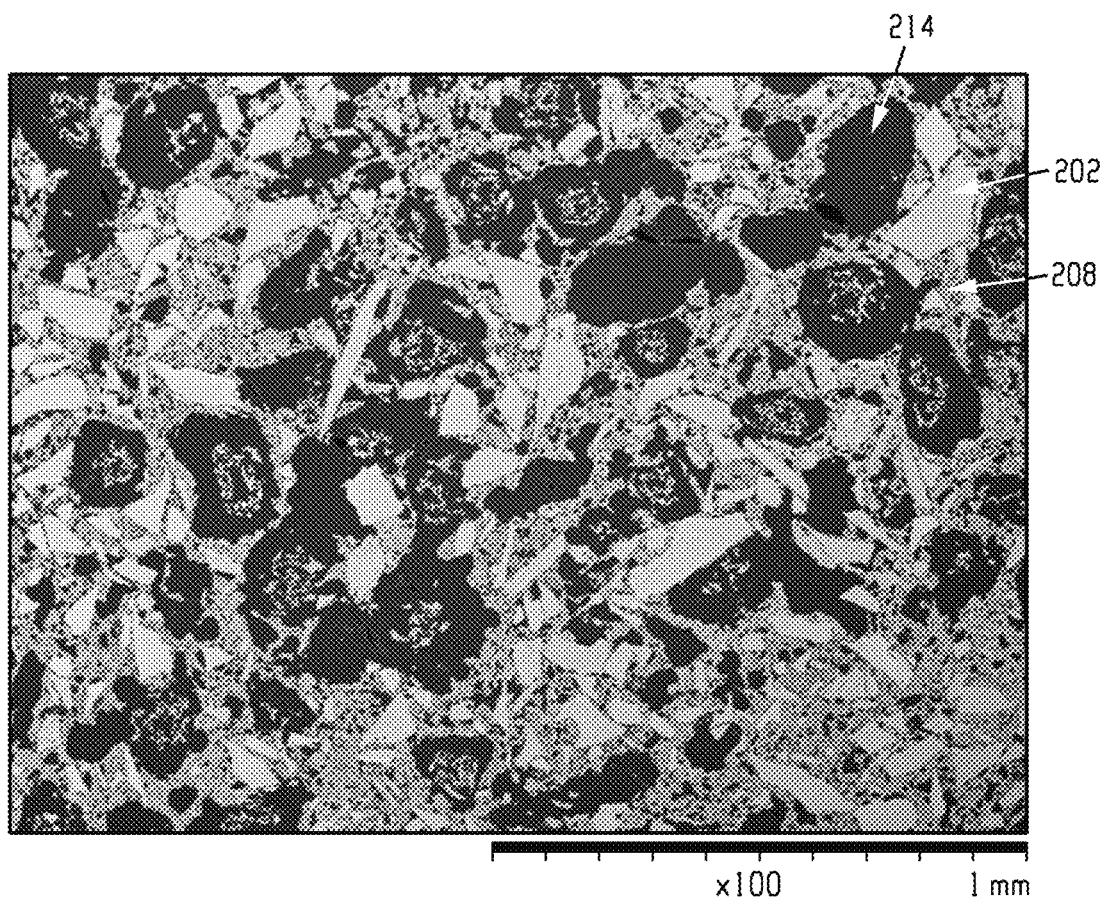
FIGS. 2A-2C show the microstructure of an article of this invention at magnifications of 100×, 250×, and 500×, respectively.
Figure 2B:
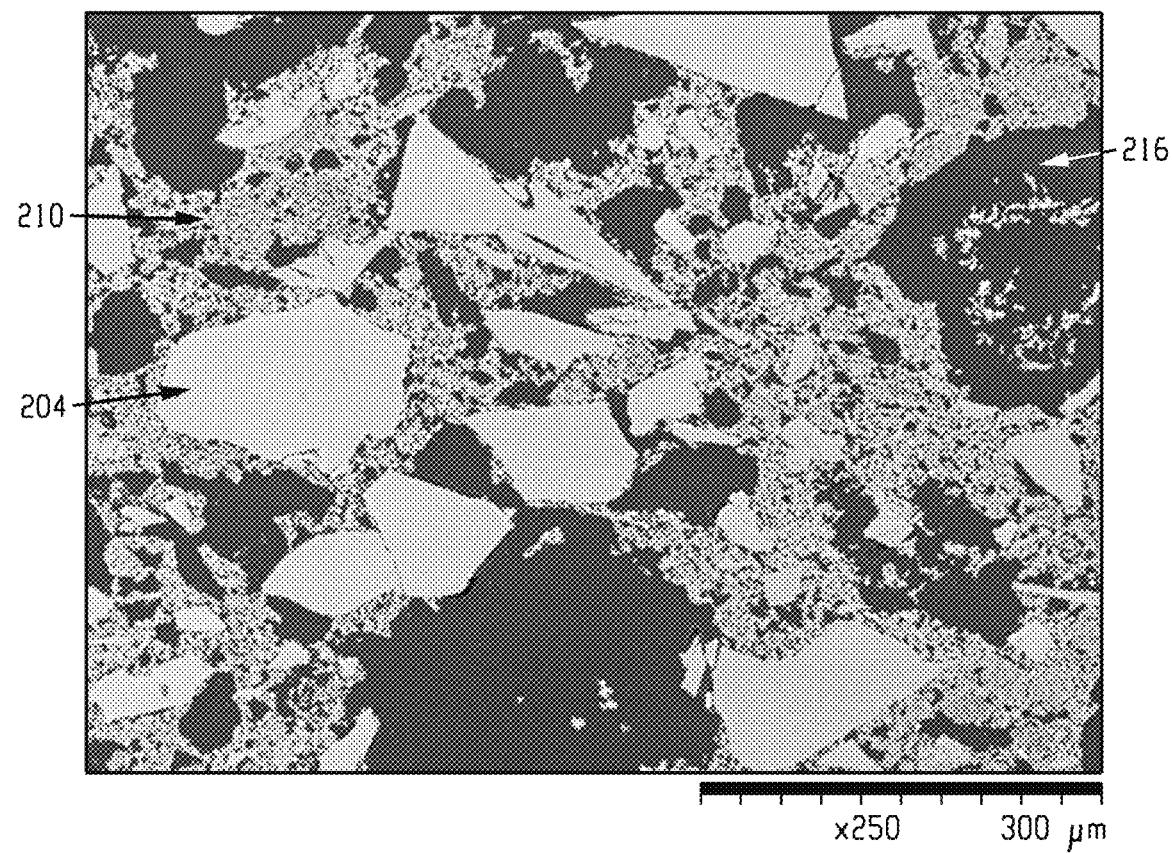
Figure 2C:
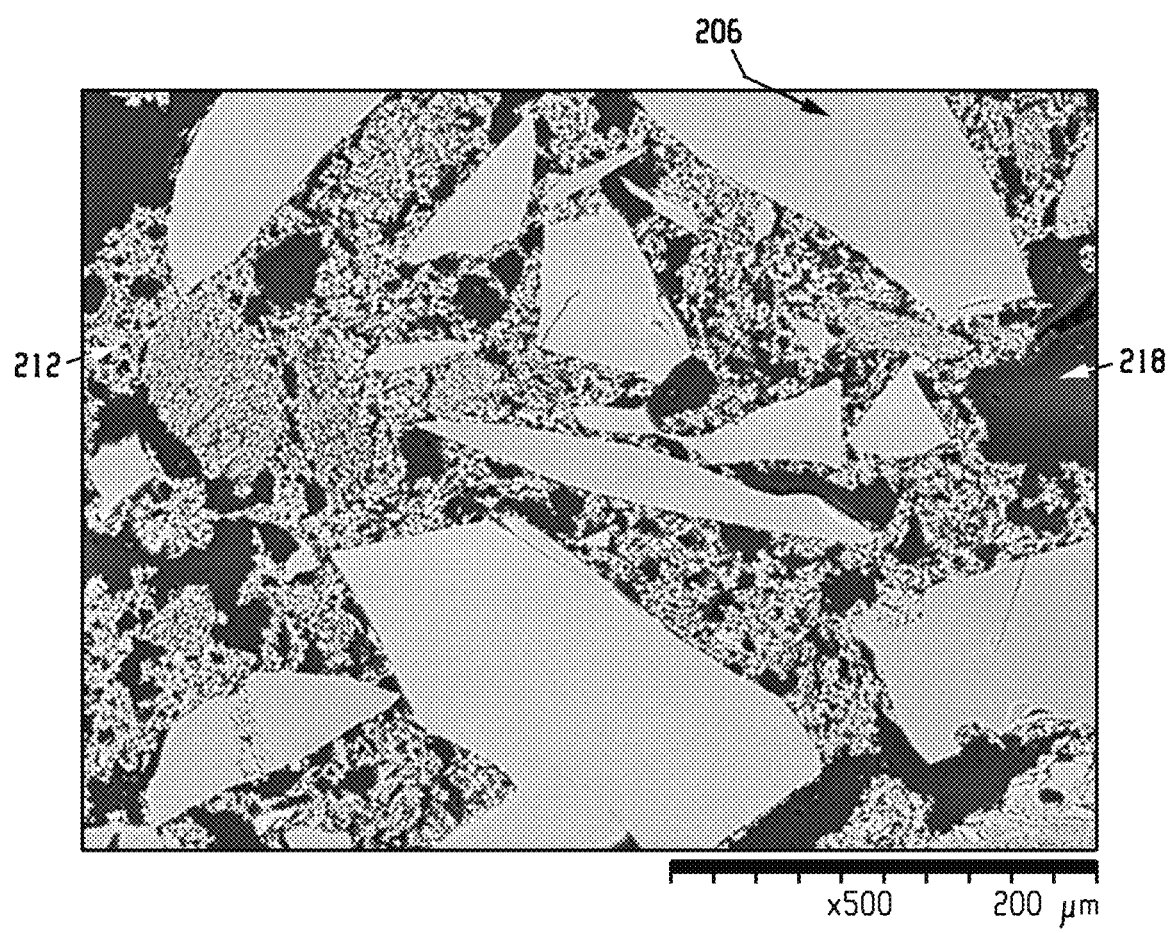

FIGS. 2A-2C show the microstructure of a ceramic article of this invention. Back-scattered electrons (BSE) microscopy images show the second alumina powder phase (regions 202, 204 and 206 in FIGS. 2A, 2B and 2C, respectively) distributed in the first alumina powder (regions 208, 210 and 212, in FIGS. 2A, 2B and 2C, respectively). The second alumina powder particle size is significantly larger than first alumina powder particle size. The magnification of FIG. 2A is 100×. The magnification of FIG. 2B is 250×. The magnification of FIG. 2C is 500×.

Figure 3B:
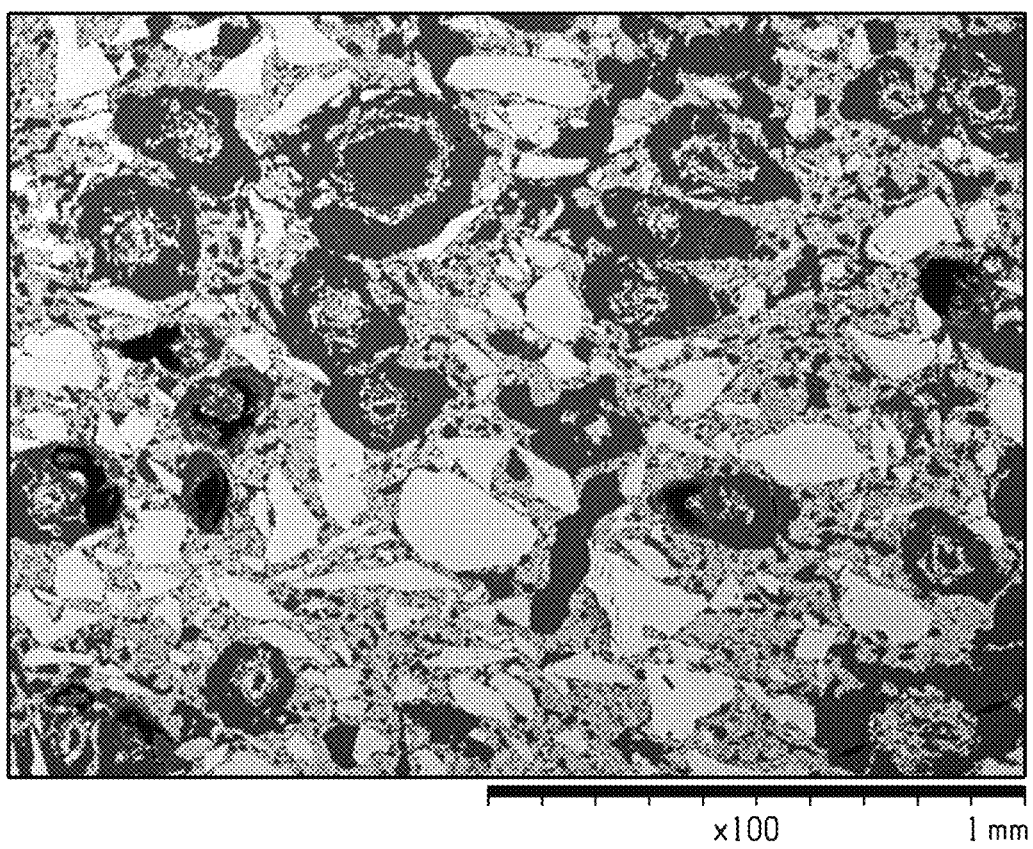

FIGS. 3A and 3B show identification of dispersed phase particles in polished cross-sections of ceramic article epoxy mounted and polished to a 1 micron finish. Samples were gold coated to prevent charging using an SPI sputter coater. A Zeiss Merlin SEM was used to generate the images using an accelerating voltage of 2 keV and a beam current of 100 pA. The type of SEM used is not critically important but needs to be able to produce images suitable for image analysis software to identify and isolate the dispersed phase. The SEM images are obtained at 100× magnification for larger size diluent particles (see FIG. 3A), and at 250× magnification for smaller size diluent particles to obtain a particle count of >100 in each image. Image analysis software was used to identify, isolate, and segregate the dispersed phase particles. See FIG. 3B. ImageJ software, which is an open source image processing program developed at the National Institutes of Health and the Laboratory for Optical and Computational Instrumentation and available for download at imageJ.net, was used to perform the analysis which determined the total area coverage of the dispersed phase in each image as well as the Feret average particle size for each image. The type of image analysis software used is not critical and those skilled in the art would be familiar with the image manipulation that is necessary to identify and isolate the dispersed phase. The area coverage of the dispersed phase was determined for four images from carrier E and one image from carrier C. Area coverage of the dispersed phase from these images was determined to be in a range of 9 to 23%. The data in Table 2 shows that the area coverage for Carrier C was 9.1 percent while the area coverage for the four images of Carrier E was approximately 20 percent.

TABLE 2

100× magnification

| Image # | Carrier | Dispersed Phase Particle Count | Area Coverage/% | Feret Average Particle Size/μm |
|---|---|---|---|---|
| 1 | E | 318 | 19.7 | 65 |
| 2 | E | 362 | 19.9 | 60 |
| 3 | E | 317 | 23.0 | 66 |
| 4 | E | 281 | 20.8 | 67 |
| 5 | C | 137 | 9.1 | 62 |

$ZnI_2$ dye penetration test values were determined using the following $ZnI_2$ solution penetration test. First, 220 g of $ZnI_2$ were placed in 1,000 mL of water at 20° C. thereby forming the $ZnI_2$ solution. A 5 g sample of ceramic article was introduced into 100 mL of $ZnI_2$ solution. The container holding the sample of ceramic article in solution was placed in a vessel under vacuum for 20 hours. The samples were removed from solution, dried at 50° C. for 24 hours, and then at 110° C. for a minimum of 2 hours. The dried samples were mounted in an epoxy resin within 30 minutes of removal from the drying oven to avoid water re-absorption. After curing of the epoxy, the samples were polished to a 3 micron finish and held in a drying oven at 100° C.

An SEM manufactured by Hitachi, model S4300 and an EDS detector manufactured by Oxford Instruments, system model Aztec SEM using a X-MaxN 150 detector, and Aztec version 3.3 SP1 software were employed to characterize the distribution of the iodide on the alumina particles. The polished samples were carbon coated to prevent charging. SEM-EDS images were taken within the ranges of the parameters shown in Table 3.

TABLE 3

| | Average | Minimum | Maximum |
|---|---|---|---|
| Accelerating Voltage: kV | 15 | 15 | 15 |
| Magnification | 261 | 90 | 1000 |
| Working Distance: mm | 14.1 | 14.1 | 14.2 |
| Number Of Channels | 2048 | 2048 | 2048 |
| Process Time | 5 | 5 | 5 |
| Live Time: sec | 200 | 63 | 428 |
| Total Counts | 13423945 | 7226384 | 23856562 |

EDS data was collected using manually selected areas including at least one of the second alumina particles and an equivalent area of first alumina particles. The EDS software was then able to generate the concentration of iodine and zinc in the respective areas. While both iodine and zinc concentrations could be used to compare penetration amounts, iodine was preferred.

Figure 4A:
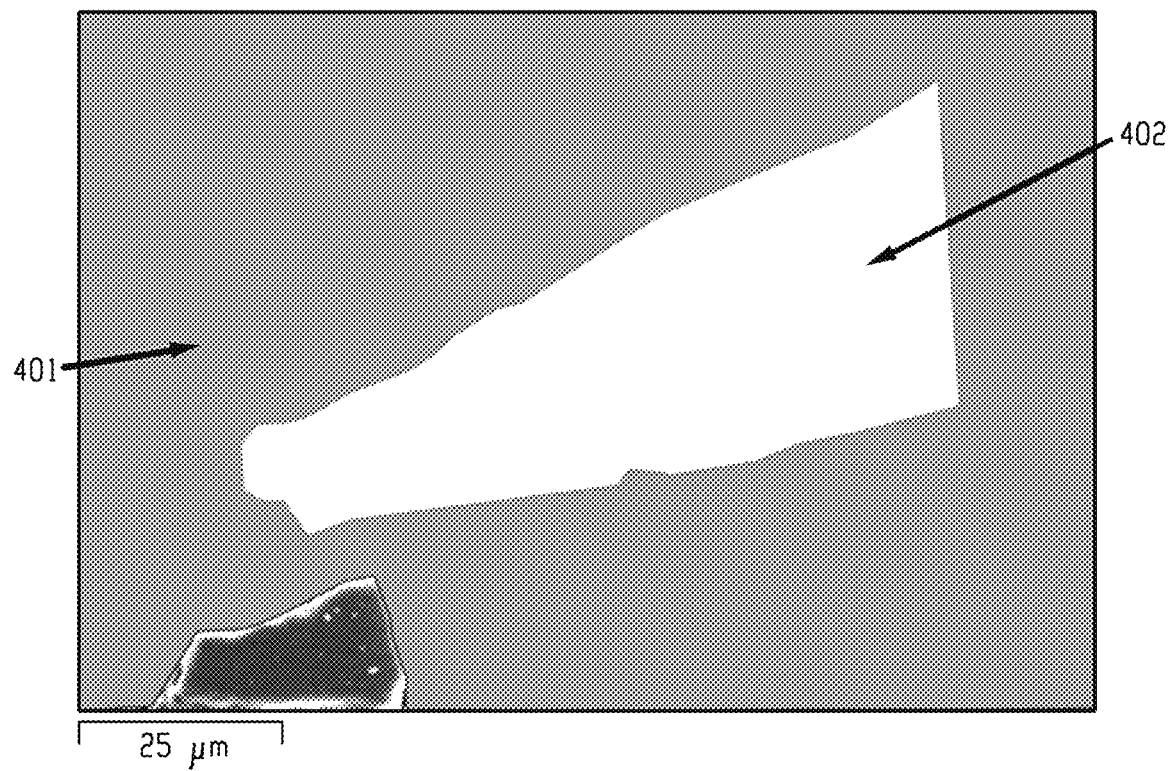
FIGS. 4A and 4B show energy-dispersive X-ray spectroscopy (EDS) data processing for an $ZnI_2$ dye penetration test.
Figure 4B:
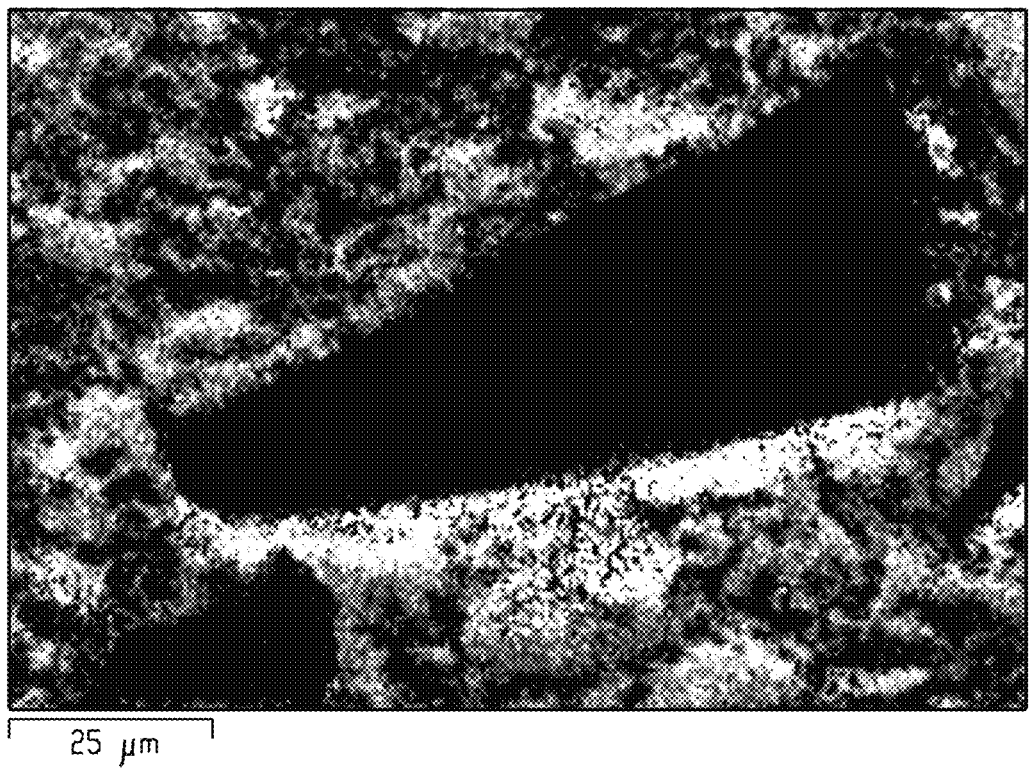

The area of a second alumina particle, which is one particle in the dispersed phase, is outlined as region 402 in FIG. 4A. EDS was used to determine the amount of iodine in region 402. FIG. 4B is an EDS image that shows the location of the $ZnI_2$ in FIG. 4A. The dark areas in FIG. 4B indicate the lack of $ZnI_2$ and the bright areas indicate the presence of $ZnI_2$. The amount of iodine in an equivalent area of the matrix phase, which is identified as region 401 in FIG. 4A, was also determined. The amount of iodine collected in each phase represents the amount of iodide penetration in a given phase. Table 4 shows the analytical data from two different Carrier D examples. In Table 4 the amount of iodine in the dispersed phase was 0.43 atomic percent while the amount of iodide in the matrix phase was 14.68 atomic percent. The quantity of iodine present in the dispersed phase is much lower than the amount of iodine in the matrix phase and is believed to correlate with the amount of a catalytically active metal, such as silver, that would be deposited on the same alumina particles when a ceramic article of this invention is manufactured for use as a catalyst carrier.

TABLE 4

| Carrier D | | | |
|---|---|---|---|
| Plurality of Alumina Particles | Al (%) | Zn (%) | I (%) |
| Dispersed | 36.99 | 0.47 | 0.43 |
| Matrix | 10.63 | 6.43 | 14.68 |

In Table 4, the percentages refer to atomic weight percent.

Figure 5B:
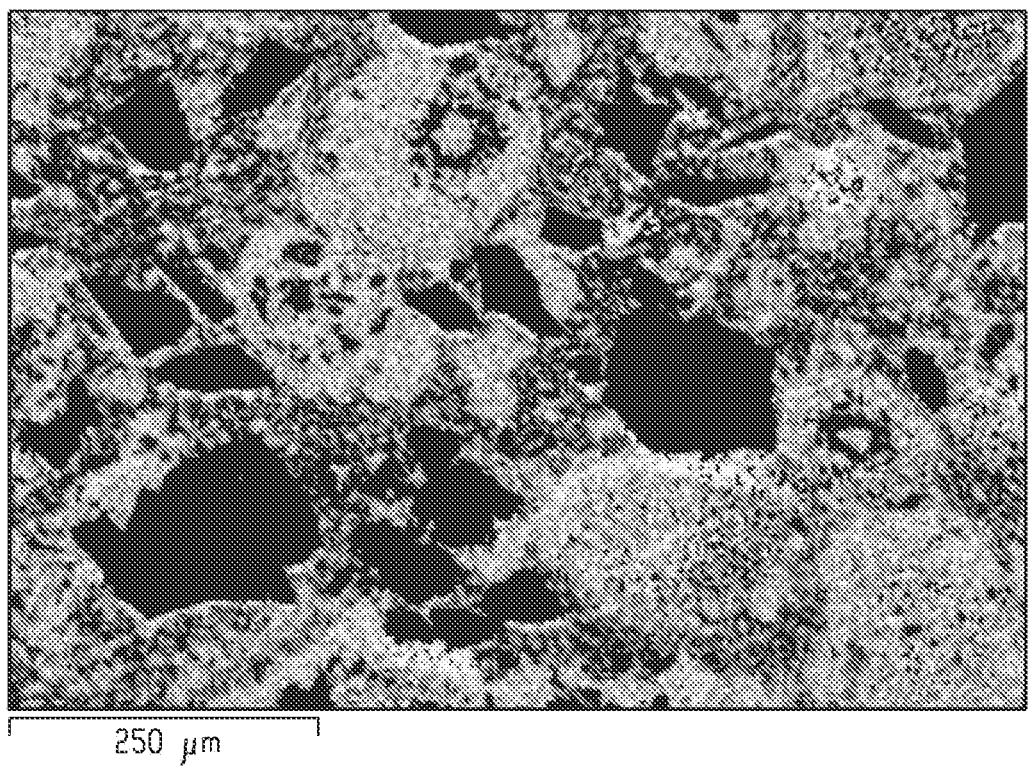

Fused alumina particles do not get infiltrated by $ZnI_2$. SEM images show distinctly larger and impenetrable particles distributed throughout the continuous matrix as shown in FIG. 5A. See particles 502, 504, and 506. FIG. 5B is an EDS image that shows the location of the $ZnI_2$ in FIG. 5A.

The dark areas in FIG. 5B indicate the lack of $ZnI_2$ and the bright areas indicate the presence of $ZnI_2$. The $ZnI_2$ dye penetration test demonstrates the ability to create an impenetrable phase distributed in the matrix phase.

Embodiments

Embodiment 1. A ceramic article, comprising:
(a) a rigid formation of alumina particles comprising a plurality of first alumina particles and a plurality of second alumina particles wherein both pluralities of particles are randomly distributed throughout the rigid formation;
  1) wherein said second alumina particles have a ZnI2 dye penetration test value no greater than 5 atomic percent and wherein said first alumina particles have a ZnI2 dye penetration test value at least twice said second alumina particles' ZnI2 dye penetration test value;
  2) wherein said rigid formation has a total cross-sectional area and each plurality of particles occupies a portion of the total cross-sectional area and the cross-sectional area of said second alumina particles is between 5% and 50% of the total cross-sectional area; and
(b) a catalytically active metal dispersed on said first and second alumina particles.

Embodiment 2. The article of embodiment 1 wherein said first alumina's ZnI2 dye penetration test value is at least three times greater than said second alumina's ZnI2 dye penetration test value.

Embodiment 3. The article of embodiment 1 wherein said first alumina's ZnI2 dye penetration test value is at least four times greater than said second alumina's ZnI2 dye penetration test value.

Embodiment 4. The article of embodiment 1 wherein said first alumina's ZnI2 dye penetration test value is greater than 10 atomic percent.

Embodiment 5. The article of embodiment 1 wherein said first alumina's ZnI2 dye penetration test value is greater than 15 atomic percent.

Embodiment 6. The article of embodiment 1 wherein said second alumina's dye penetration test value is no greater than 3 atomic percent.

Embodiment 7. The article of embodiment 1 wherein the ratio of said first alumina's dye penetration test value to said second alumina's dye penetration test value is at least 2:1.

Embodiment 8. The article of embodiment 1 wherein the cross-sectional area of said second alumina particles is between 8% and 40% of the total cross-sectional area.

Embodiment 9. The article of embodiment 1 wherein the cross-sectional area of said second alumina particles is between 10% and 30% of the total cross-sectional area.

Embodiment 10. The article of embodiment 1, further comprising a total pore volume between about 0.2 cm3/g and about 0.6 cm3/g.

Embodiment 11. The article of embodiment 10, wherein the total pore volume is between about 0.3 cm3/g and about 0.5 cm3/g.

Embodiment 12. The article of embodiment 10, wherein the total pore volume is between about 0.35 cm3/g and about 0.5 cm3/g.

Embodiment 13. The article of embodiment 1 wherein said catalytically active metal is selected from the group consisting of silver, platinum, palladium, nickel, and copper.

Embodiment 14. A process for the manufacture of a ceramic article comprising a rigid formation of alumina particles and a catalytically active metal in contact with said particles, said process comprising:
(a) providing a plurality of first alpha alumina particles having a known weight and a d50 particle size between about 0.2 and 100 microns;
(b) providing a plurality of second alpha alumina particles having a known weight and selected from the group consisting of fused alumina and tabular alumina, said second alumina particles having a d50 particle size between about 5 and 400 microns, wherein the ratio of the first alumina particle's d50 particle size to the second alumina particle's d50 particle size is between 1:4 and 1:40, and wherein the ratio of said first alumina's weight to said second alumina's weight is between 1:1 and 15:1;
(c) mixing said pluralities of alumina particles thereby forming a mixture wherein said particles are randomly distributed throughout the mixture;
(d) forming said mixture into a plurality of malleable articles;
(e) heating said malleable articles to the sintering temperature of said alumina particles thereby forming each malleable article into a rigid formation of alumina particles wherein the particles in each plurality of particles are randomly distributed throughout the rigid formation; and
(f) depositing a catalytically active metal on said first and second alumina particles.

Embodiment 15. The process of embodiment 14 wherein the ratio of said first alumina's weight to said second alumina's weight is between 1:1 and 10:1.

Embodiment 16. The process of embodiment 14 wherein the ratio of said first alumina's weight to said second alumina's weight is between 1:1 and 5:1.

Embodiment 17. The process of embodiment 14 wherein the ratio of the first alumina particle's d50 particle size to the second alumina particle's d50 particle size is between 1:5 and 1:20.

Embodiment 18. The process of embodiment 14 wherein the ratio of the first alumina particle's d50 particle size to the second alumina particle's d50 particle size is between 1:8 and 1:15.

Embodiment 19. The process of embodiment 14 wherein said second alumina particles have a d50 particle size between about 10 and 200 microns.

Embodiment 20. The process of embodiment 14 wherein said second alumina particles have a d50 particle size between about 40 and 150 microns.

Embodiment 21. The process of embodiment 14 wherein said plurality of first alumina particles has a surface area of between 1.0 m2/g and 20.0 m2/g.

Embodiment 22. The process of embodiment 14 wherein said plurality of first alumina particles has a surface area of between 1.0 m2/g and 5.0 m2/g.

Embodiment 23. The process of embodiment 14 wherein said plurality of first alumina particles has a surface area of between 1.0 m2/g and 2.0 m2/g.

Embodiment 24. The process of embodiment 14 wherein said plurality of second alumina particles has a surface area between 0.01 m2/g and 2.00 m2/g.

Embodiment 25. The process of embodiment 14 wherein said plurality of second alumina particles has a surface area between 0.10 m2/g and 0.50 m2/g.

Embodiment 26. The process of embodiment 14 wherein said plurality of second alumina particles has a surface area between 0.14 m2/g and 0.30 m2/g.

Embodiment 27. The process of embodiment 14 wherein said second alumina particles consists essentially of fused alumina.

Embodiment 28. The process of embodiment 14 wherein said second alumina particles consists of fused alumina.

Embodiment 29. The process of embodiment 14 wherein said second alumina particles consists essentially of tabular alumina.

Embodiment 30. The process of embodiment 14 wherein said second alumina particles consists of tabular alumina.

Embodiment 31. The process of embodiment 14 wherein said second alumina particles consists essentially of tabular alumina and fused alumina.

Embodiment 32. The process of embodiment 14 wherein said second alumina particles consists of tabular alumina and fused alumina.

Unless defined otherwise, all technical and scientific terms used herein have the same meaning as is commonly understood by one of skill in the art to which this invention belongs. All patents and publications referred to herein are incorporated by reference in their entireties.

When ranges are used herein to describe, for example, physical or chemical properties such as molecular weight or chemical formulae, all combinations and subcombinations of ranges and specific embodiments therein are intended to be included. Use of the term "about" when referring to a number or a numerical range means that the number or numerical range referred to is an approximation within experimental variability (or within statistical experimental error), and thus the number or numerical range may vary. The variation is typically from 0% to 5% of the stated number or numerical range.

The transitional terms "comprising", "consisting essentially of" and "consisting of", when used in the appended claims, in original and amended form, define the claim scope with respect to what unrecited additional claim elements or steps, if any, are excluded from the scope of the claim(s). The term "comprising" is intended to be inclusive or open-ended and does not exclude any additional, unrecited element, method, step, or material. The term "consisting of" excludes any element, step, or material other than those specified in the claim and, in the latter instance, impurities ordinary associated with the specified material(s). The term "consisting essentially of" limits the scope of a claim to the specified elements, steps, or material(s) and those that do not materially affect the basic and novel characteristic(s) of the claimed invention. All compounds, compositions, formulations, and methods described herein that embody the present invention can, in alternate embodiments, be more specifically defined by any of the transitional terms "comprising," "consisting essentially of," and "consisting of" The term "comprising" (and related terms such as "comprise" or "comprises" or "having" or "including") includes those embodiments such as, for example, an embodiment of any composition of matter, method, or process that "consist of" or "consist essentially of" the described features.

What is claimed is:

1. A ceramic article, comprising:
    (a) a rigid formation of alumina particles comprising a plurality of first alumina particles and a plurality of second alumina particles, wherein both pluralities of particles are randomly distributed throughout the rigid formation,
        1) wherein said second alumina particles have a $ZnI_2$ dye penetration test value no greater than 5 atomic percent and wherein said first alumina particles have a $ZnI_2$ dye penetration test value at least twice said second alumina particles' $ZnI_2$ dye penetration test value;
        2) Wherein said rigid formation has a total cross-sectional area and each plurality of particles occupies a portion of the total cross-sectional area and the cross-sectional area of said second alumina particles is between 5% and 50% of the total cross-sectional area; and
    (b) a catalytically active metal dispersed on said first and second alumina particles.

2. The article of claim 1, wherein said first alumina's $ZnI_2$ dye penetration test value is at least three times greater than said second alumina's $ZnI_2$ dye penetration test value.

3. The article of claim 1, wherein said first alumina's $ZnI_2$ dye penetration test value is at least four times greater than said second alumina's $ZnI_2$ dye penetration test value.

4. The article of claim 1 wherein, said first alumina's $ZnI_2$ dye penetration test value is greater than 10 atomic percent.

5. The article of claim 1, wherein said first alumina's $ZnI_2$ dye penetration test value is greater than 15 atomic percent.

6. The article of claim 1, wherein said second alumina's dye penetration test value is no greater than 3 atomic percent.

7. The article of claim 1, wherein the ratio of said first alumina's dye penetration test value to said second alumina's dye penetration test value is at least 2:1.

8. The article of claim 1, wherein the cross-sectional area of said second alumina particles is between 8% and 40% of the total cross-sectional area.

9. The article of claim 1, wherein the cross-sectional area of said second alumina particles is between 10% and 30% of the total cross-sectional area.

10. The article of claim 1, further comprising a total pore volume between about 0.2 $cm^3/g$ and about 0.6 $cm^3/g$.

11. The article of claim 10, wherein the total pore volume is between about 0.3 $cm^3/g$ and about 0.5 $cm^3/g$.

12. The article of claim 10, wherein the total pore volume is between about 0.35 $cm^3/g$ and about 0.5 $cm^3/g$.

13. The article of claim, 1 wherein said catalytically active metal is selected from the group consisting of silver, platinum, palladium, nickel and copper.

* * * * *